(12) United States Patent
Sawada et al.

(10) Patent No.: US 8,132,867 B2
(45) Date of Patent: Mar. 13, 2012

(54) BRAKE CONTROL APPARATUS

(75) Inventors: Mototsugu Sawada, Kariya (JP); Shigeru Saito, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 668 days.

(21) Appl. No.: 12/269,903

(22) Filed: Nov. 13, 2008

(65) Prior Publication Data

US 2009/0127929 A1    May 21, 2009

(30) Foreign Application Priority Data

Nov. 15, 2007 (JP) ................................ 2007-297099
Jul. 28, 2008 (JP) ................................ 2008-193698

(51) Int. Cl.
*B60T 8/06* (2006.01)

(52) U.S. Cl. .................................... 303/122.06; 303/122

(58) Field of Classification Search ............ 303/122.03–122.06, 166, 173, 178, 122
See application file for complete search history.

(56) References Cited

U.S. PATENT DOCUMENTS 3,907,380 A * 9/1975 Fleischer et al. ......... 303/122.06
6,238,021 B1 * 5/2001 Sugimoto ..................... 303/193

* cited by examiner

*Primary Examiner* — Christopher Schwartz
(74) *Attorney, Agent, or Firm* — Buchanan Ingersoll & Rooney PC

(57) ABSTRACT

A brake control apparatus includes a braking force applying apparatus for applying a braking force to each of a plurality of wheels adapted to a vehicle, a braking force testing device for testing the braking force of a predetermined malfunction test subject wheel by controlling the braking force applied thereto to be reduced or maintained for a predetermined time on the basis of a test actuation pattern while the braking force applied to each wheel is increased, a wheel speed detecting device for detecting a wheel speed of each of the plurality of the wheels including the malfunction test subject wheel, and a malfunction detecting device for detecting a malfunctioning state, in a case where changes of the wheel speed of the malfunction test subject wheel towards acceleration is not detected while the braking force testing device testing the braking force applied to the malfunction test subject wheel.

13 Claims, 11 Drawing Sheets

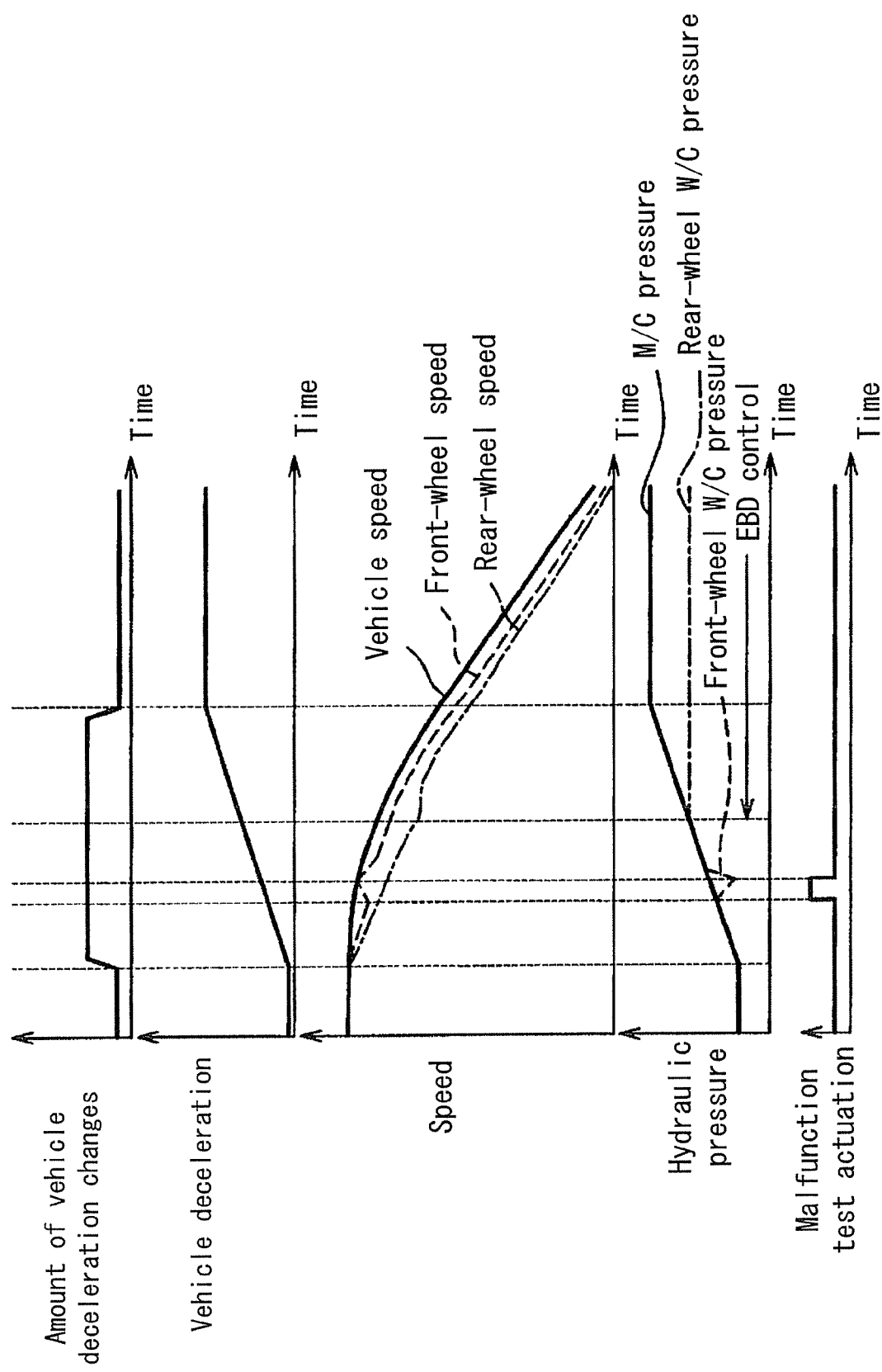

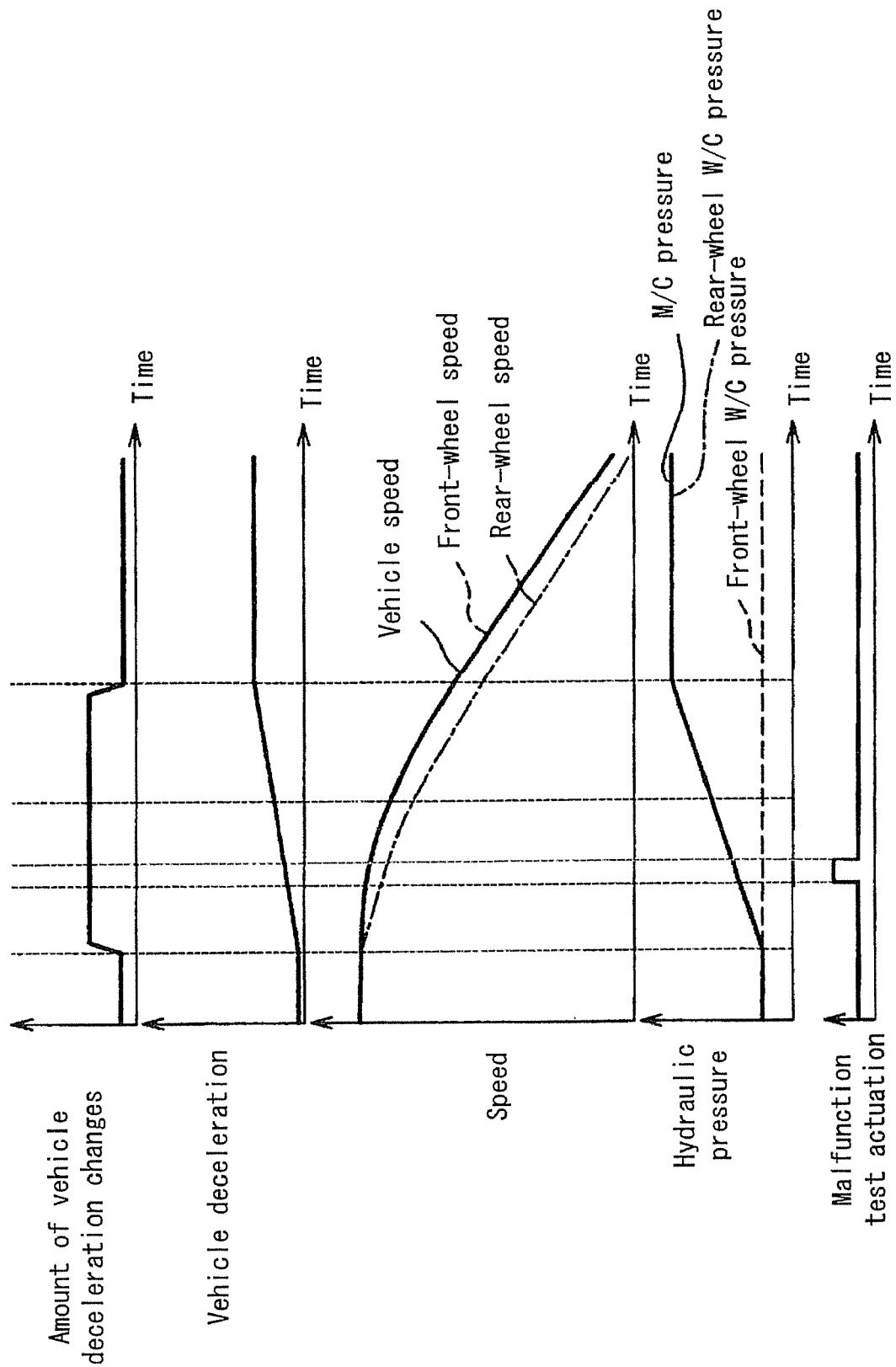

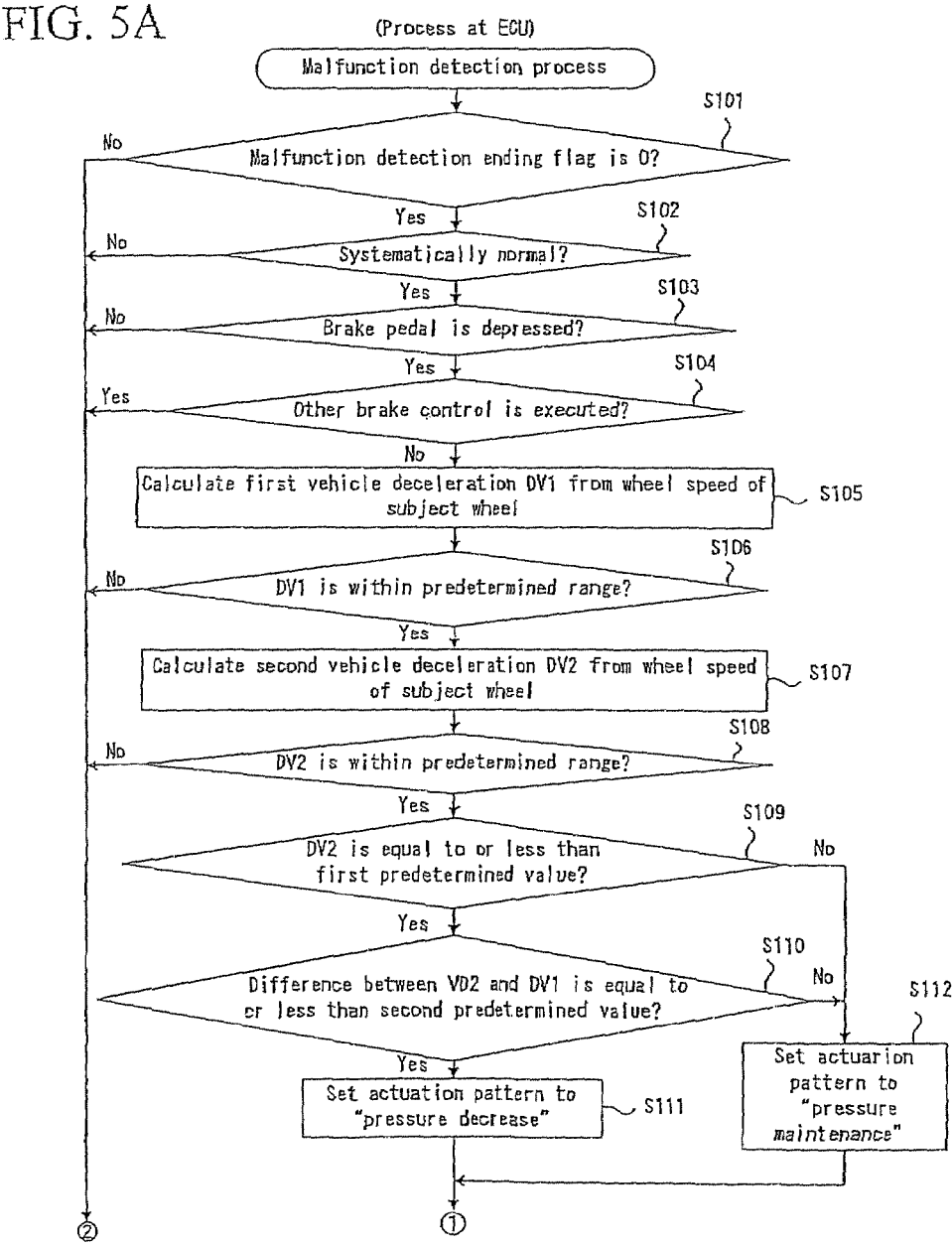

BRAKE CONTROL APPARATUS

This application is based on and claims priority under 35 U.S.C. §119 to Japanese Patent Application 2007-297099, filed on Nov. 15, 2007, and Japanese Patent Application 2008-193698, filed on Jul. 28, 2008, the entire contents of which are incorporated herein by reference.

FIELD OF THE INVENTION

The present invention relates to a brake control apparatus. More specifically, the present invention pertains to a brake control apparatus that accurately detects a malfunction of a braking force.

BACKGROUND

A conventional brake control apparatus for a vehicle applies braking force to wheels by utilizing a hydraulic pressure of a brake fluid, air pressure and the like as a pressure source. In the conventional brake control apparatus, when a brake fluid leakage or air leakage occurs, a malfunction such as failure of applying the braking force to the wheels may be induced. Therefore, the conventional brake control apparatus is configured to detect a malfunctioning state of the braking force and controls the braking force applied to a wheel that is not malfunctioning in order to stop the vehicle safely.

For example, JP1996-282465A discloses a brake control apparatus that detects a malfunction of a wheel to which a hydraulic pressure control based on an anti-skid control is executed. The brake control apparatus disclosed in JP1996-282465A determines that the anti-skid control is not executed with regard to the wheel subjected to the anti-skid control in a case where a wheel speed of the anti-skid control subject wheel is greater than a wheel speed of a wheel to which the anti-skid control is not executed, contrary to the fact where the wheel speed of the anti-skid control subject wheel becomes generally equal to or less than the wheel speed of the wheel to which the anti-skid control is not executed. As a result, the brake control apparatus disclosed in JP1996-282465A determines that the anti-skid control subject wheel is in the malfunctioning state. As mentioned above, the brake control system disclosed in JP1996-282465A detects the malfunction by comparing wheel a speed of two wheels.

However, an unpredictable difference may occur in the wheel speed of each wheel because of a diameter of a tire attached at each wheel, distribution of the braking force to each wheel, a load applied to each wheel, and effectiveness of brake achieved by abrasion of a brake pad of each wheel may vary. Therefore, comparison between the wheel speeds of two wheels as is disclosed in JP1996-282465A may induce a false detection of the malfunction of the braking force.

A need thus exists to provide a brake control apparatus which is not susceptible to the drawback mentioned above.

SUMMARY OF THE INVENTION

According to an aspect of the present invention, a brake control apparatus includes a braking force applying apparatus for applying a braking force relative to each of a plurality of wheels adapted to a vehicle, a braking force testing device for testing the braking force of a predetermined malfunction test subject wheel by controlling the braking force applied relative to the malfunction test subject wheel to be reduced or maintained for a predetermined time on the basis of a test actuation pattern while the braking force applied relative to each of the plurality of wheels is increased by the braking force applying apparatus, a wheel speed detecting device for detecting a wheel speed of each of the plurality of the wheels including the malfunction test subject wheel, the wheel speed corresponding to a rotational speed of each of the plurality of the wheels, and a malfunction detecting device for detecting a malfunctioning state, where the braking force is not applied relative to the malfunction test subject wheel, in a case where changes of the wheel speed of the malfunction test subject wheel, detected by the wheel speed detecting device, towards acceleration is not detected while the braking force testing device testing the braking force applied relative to the malfunction test subject wheel.

According to another aspect of the present invention, a brake control apparatus includes a braking force applying apparatus for applying a braking force relative to each of a plurality of wheels, having a front-wheel and a rear-wheel, adapted to a vehicle, a rear-wheel braking force restriction-controlling device for restricting an increase of the braking force applied relative to the rear-wheel, a braking force testing device for testing the braking force applied relative to the front-wheel by controlling the braking force applied relative to the front-wheel to be reduced or maintained for a predetermined time on the basis of a test actuation pattern before the increase of the braking force applied relative to the rear-wheel is restricted by the rear-wheel braking force restriction-controlling device, while the braking force applied relative to each of the plurality of wheels) is increased by the braking force applying means, a wheel speed detecting device for detecting a wheel speed of the front-wheel to which the braking force controlled by the braking force testing device is applied, the wheel speed indicating a rotational speed of the front-wheel, a malfunction detecting device for detecting a malfunctioning state, where the braking force is not applied relative to the front-wheel, in a case where changes of the wheel speed, detected by the wheel speed detecting device, towards acceleration is not detected while the braking force testing device testing the braking force applied relative to the front-wheel, and a rear-wheel braking force restriction-control prohibiting device for prohibiting a restriction control on the increase of the braking force applied relative to the rear-wheel by the rear-wheel braking force restriction-controlling device in a case where the malfunction detecting device detects that the front-wheel is in the malfunctioning state.

According to a further aspect of the present invention, a brake control apparatus includes a braking force applying apparatus for applying a braking force relative to each of a plurality of wheels, having a front-wheel and a rear-wheel, adapted to a vehicle, a rear-wheel braking force restriction-controlling device for restricting an increase of the braking force applied relative to the rear-wheel, a braking force testing device for testing the braking force applied relative to the front-wheel by controlling the braking force applied relative to the front-wheel to be reduced for a predetermined time on the basis of a test actuation pattern while the increase of the braking force applied relative to the rear-wheel is restricted by the rear-wheel braking force restriction-controlling device, a wheel speed detecting device for detecting a wheel speed of the front-wheel to which the braking force controlled by the braking force testing device is applied, the wheel speed indicates a rotational speed of the front-wheel, a malfunction detecting device for detecting a malfunctioning state, where the braking force is not applied relative to the front-wheel, in a case where changes of the wheel speed, detected by the wheel speed detecting device, towards acceleration is not detected while the braking force testing device testing the braking force applied to the front-wheel, and a rear-wheel braking force restriction-control ending device for ending a restriction control on the increase of the braking force applied relative to the rear-wheel by the rear-wheel braking force restriction-controlling device in a case where the malfunction detecting device detects that the front-wheel is in the malfunctioning state.

BRIEF DESCRIPTION OF THE DRAWINGS

The foregoing and additional features and characteristics of the present invention will become more apparent from the following detailed description considered with the reference to the accompanying drawings, wherein:

FIG. 3A is a diagram for explaining an malfunction detection principle of a malfunction detection program in a case where a front-right wheel is set as a subject wheel and where a brake circuit for the front-right wheel is not malfunctioning;

FIG. 3B is a diagram for explaining an malfunction detection principle of the malfunction detection program in a case where the front-right wheel is set as the subject wheel and a brake circuit where the front-right wheel is malfunctioning;

DETAILED DESCRIPTION

Figure 1:
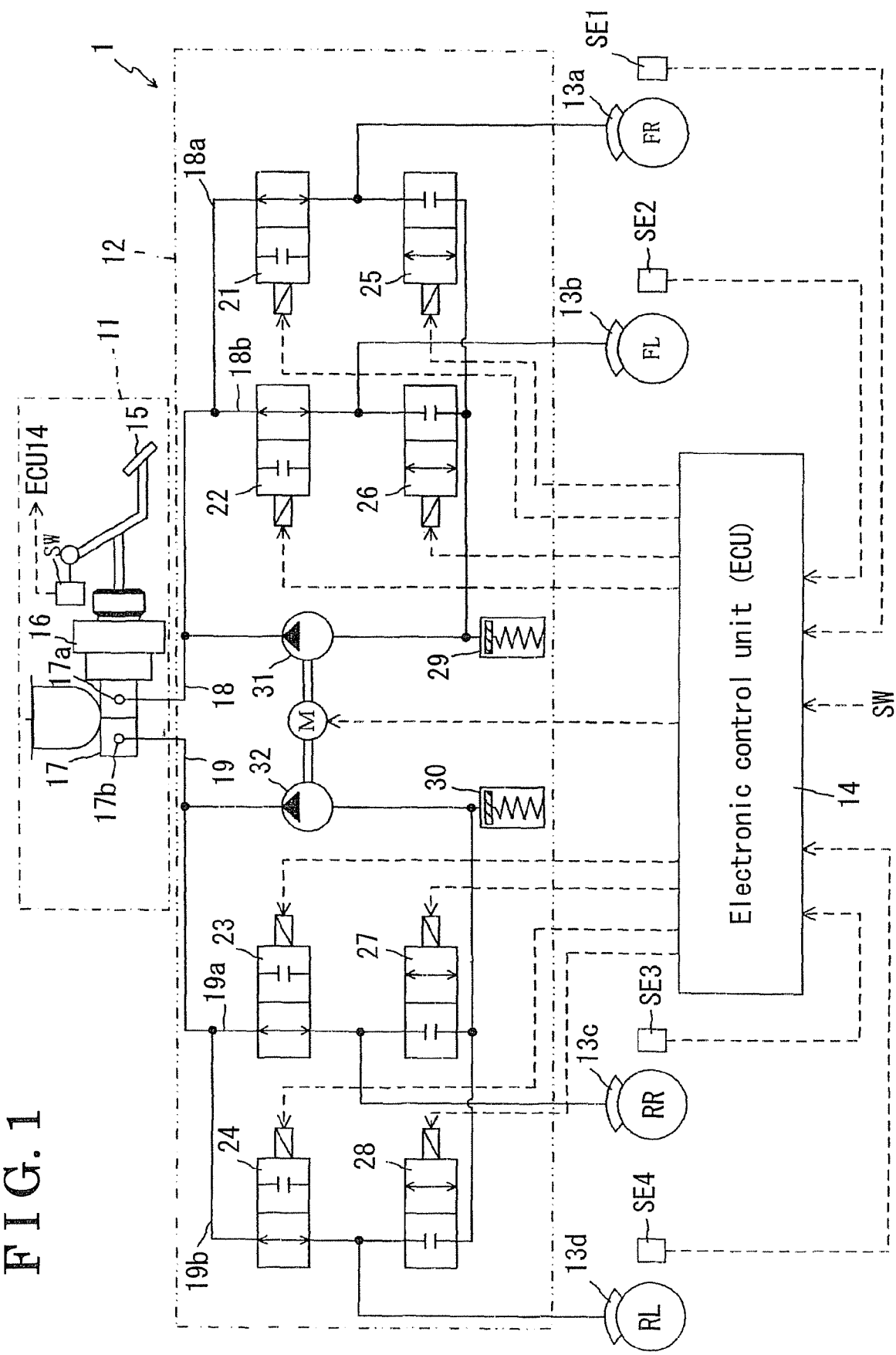
FIG. 1 is a diagram schematically illustrating an entire structure of a brake control apparatus of a first embodiment.

Embodiments of a brake control apparatus related to the present invention will be described below in accordance with the attached drawings. FIG. 1 is a view schematically illustrating an entire structure of a brake control apparatus 1 of the embodiment.

First Embodiment

The brake control apparatus 1 is mounted on a vehicle having four wheels (a font-right wheel FR, a front-left wheel FL, a rear-right wheel RR and a rear-left wheel RL). The brake control apparatus 1 is an apparatus for applying a braking force to each of the four wheels FR, FL, RR and RL by using a hydraulic pressure of a brake fluid as a pressure source. The brake control apparatus 1 accurately detects a malfunction or a failure of the braking force where the braking force is not applied to the wheel because of a brake fluid leakage and the like.

As illustrated in FIG. 1, the brake control apparatus 1 includes a hydraulic pressure generating apparatus 11 for generating the hydraulic pressure on the brake fluid, a hydraulic pressure controlling apparatus 12 for controlling the hydraulic pressure applied to wheel cylinders 13a, 13b, 13c and 13d (a braking force applying means) so as to be increased, decreased or maintained, the wheel cylinders 13a, 13b, 13c and 13d that are provided at the respective wheels FR, FL, RR and RL and that convert the hydraulic pressure supplied from the hydraulic pressure controlling apparatus 12 into the braking force and apply the braking force to the respective wheels FR, FL, RR and RL, wheel speed sensors SE1, SE2, SE3 and SE4 that configure a speed sensor SE (a wheel speed detecting means), and that are provided at the respective wheels FR, FL, RR and RL and detect wheel speeds (i.e. rotational speeds) of the respective wheels FR, FL, RR and RL, and an electronic control unit 14 (hereinafter referred to as an ECU 14) for controlling the hydraulic pressure controlling apparatus 12. The ECU 14 serves as a braking force testing means, a malfunction determining means, a rear-wheel braking force restriction-controlling means, a rear-wheel braking force restriction-control prohibiting means, a rear-wheel braking force restriction-control ending means, a deceleration calculating means, and a deceleration change calculating means.

The hydraulic pressure generating apparatus 11 includes a brake pedal 15, a booster 16 and a master cylinder 17. The brake pedal 15 is a pedal to which a driver applies a depressing force in order to apply the braking force to the wheels FR, FL, RR and RL. A brake switch SW is provided at the brake pedal 15. The brake switch SW is turned on while the depressing force is applied to the brake pedal 15 and is turned off in other cases. An output signal of the brake switch SW is transmitted to the ECU 14.

The booster 16 is a device for boosting the depressing force applied to the brake pedal 15 and transmitting the boosted depressing force to the master cylinder 17.

The master cylinder 17 is a device for generating the hydraulic pressure on the brake fluid in response to the depressing force boosted by the booster 16. The master cylinder 17 is provided with two outlet ports (a first outlet port 17a and a second outlet port 17b). The independently generated hydraulic pressure is outputted to each of the first and second outlet ports 17a and 17b. A first hydraulic circuit 18 is connected to the first outlet port 17a and a second hydraulic circuit 19 is connected to the second outlet port 17b. As a result, even if the brake fluid leaks from one of the first and the second hydraulic circuits 18 and 19 and the malfunction occurs, the braking force is still appliable to the wheels through the other hydraulic circuit.

The hydraulic pressure controlling apparatus 12 includes the first hydraulic circuit 18 and the second hydraulic circuit 19, which are separate and independent from each other and which form a so-called front-rear type dual circuit system. More specifically, the first hydraulic circuit 18 is a circuit for the front-wheels FR and FL, and the second hydraulic circuit 19 is a circuit for the rear-wheels RR and RL. More specifically, the first hydraulic circuit 18 includes a brake circuit 18a for the front-right wheel FR (hereinafter referred to as a front-right wheel brake circuit 18a) connected to the wheel cylinder 13a that is provided at the front-right wheel FR and a brake circuit 18b for the front-left wheel FL (hereinafter referred to as a front-left wheel brake circuit 18b) connected to the wheel cylinder 13b that is provided at the front-left wheel FL. The second hydraulic circuit 19 includes a brake circuit 19a for the rear-right wheel RR (hereinafter referred to as a rear-right wheel brake circuit 19a) connected to the wheel cylinder 13c that is provided at the rear-right wheel RR and a brake circuit 19b for the rear-left wheel RL (hereinafter referred to as a rear-left wheel brake circuit 19b) connected to the wheel cylinder 13d that is provided at the rear-left wheel RL.

Further, the first hydraulic circuit 18 and the second hydraulic circuit 19 are provided with a first reservoir 29 and a second reservoir 30, respectively. Each of the first and second reservoirs 29 and 30 includes a piston and a spring.

The first reservoir 29 accommodates therein the brake fluid flowing out from the front-right wheel brake circuit 18a and the front-left wheel brake circuit 18b. The second reservoir 30 accommodates therein the brake fluid flowing out from the rear-right wheel brake circuit 19a and the rear-left wheel brake circuit 19b.

Further, the first hydraulic circuit 18 and the second hydraulic circuit 19 of the hydraulic pressure controlling apparatus 12 are provided with a first pump 31 and a second pump 32, respectively. A motor M that drives the first and the second pump 31 and 32 simultaneously is provided on the hydraulic controlling apparatus 12. The first and the second pumps 31 and 32 are connected to the first and second reservoirs 29 and 30 at inlet sides of the first and second pumps 31 and 32, respectively. Outlet sides of the first and the second pumps 31 and 32 are connected to the first and the second outlet ports 17a and 17b, respectively. The brake fluid stored in the first and second reservoirs 29 and 30 is supplied to the master cylinder 17 in response to an actuation of the respective first and second pumps 31 and 32. The motor M drives the first and second pumps 31 and 32 on the basis of a control signal from the ECU 14.

A first normally-open-type electromagnetic valve 21 (a NO-type electromagnetic valve 21) is provided on the front-right wheel conduit 18a hydraulically between the first outlet port 17a and the wheel cylinder 13a. A first normally-closed-type electromagnetic valve 25 (a NC-type electromagnetic valve 25) is provided on the front-right wheel brake circuit 18a hydraulically between the wheel cylinder 13a and the first reservoir 29. Similarly, a second normally-open-type electromagnetic valve 22 is provided on the front-left wheel brake circuit 18b hydraulically between the first outlet port 17a and the wheel cylinder 13b, and a second normally-closed-type electromagnetic valve 26 is provided hydraulically between the wheel cylinder 13b and the first reservoir 29. A third normally-open-type electromagnetic valve 23 is provided on the rear-right wheel brake circuit 19a hydraulically between the second outlet port 17b and the wheel cylinder 13c, and a third normally-closed-type electromagnetic valve 27 is provided hydraulically between the wheel cylinder 13c and the second reservoir 30. A fourth normally-open-type electromagnetic valve 24 is provided on the rear-left wheel brake circuit 19b hydraulically between the second outlet port 17b and the wheel cylinder 13d, and a fourth normally-closed-type electromagnetic valve 28 is provided hydraulically between the wheel cylinder 13d and the second reservoir 30.

Each of the first, second, third and fourth normally-open-type electromagnetic valves 21, 22, 23 and 24 is turned to be in an open state in a case where an electromagnetic coil provided at each normally-open-type electromagnetic valve is energized, and is turned to be in a closed state in a case where the electromagnetic coil provided at each electromagnetic valve is not energized. Each of the first, second, third and fourth normally-closed-type electromagnetic valves 25, 26, 27 and 28 is turned to be in a closed state in a case where each electromagnetic coil, provided at each normally-closed-type electromagnetic valve, is not energized, and is turned to be in an open state in a case where each electromagnetic coil is energized. FIG. 1 illustrates a state where each electromagnetic valve 21, 22, 23, 24, 25, 26, 26 and 28 is not energized.

In a case where both the electromagnetic coils of the first normally-open-type electromagnetic valve 21 and the first normally-closed-type electromagnetic valve 25 are not energized, the first normally-open-type electromagnetic valve 21 is turned to be in the open state and the first normally-closed-type electromagnetic valve 25 is turned to be in the closed state. As a result, the brake fluid supplied from the first outlet port 17a flows into the wheel cylinder 13a through the front-right wheel conduit 18a, thereby increasing the hydraulic pressure within the wheel cylinder 13a.

On the other hand, in a case where both electromagnetic coils of the first normally-open-type electromagnetic valve 21 and the first normally-closed-type electromagnetic valve 25 are energized, the first normally-open-type electromagnetic valve 21 is turned to be in the closed state and the first normally-closed-type electromagnetic valve 25 is turned to be in the open state. As a result, the brake fluid flows out from the wheel cylinder 13a to the reservoir 29 through the front-right wheel conduit 18a, thereby decreasing the hydraulic pressure within the wheel cylinder 13a.

Further, in a case where the electromagnetic coil of the first normally-open-type electromagnetic valve 21 is energized and the electromagnetic coil of the first normally-closed-type electromagnetic valve 25 is not energized, both the first normally-open-type electromagnetic valve 21 and the first normally-closed-type electromagnetic valve 25 are turned to be in the closed state. As a result, a flow of the brake fluid through the front-right wheel conduit 18a is restricted, thereby maintaining a level of the hydraulic pressure within the wheel cylinder 13a.

The hydraulic pressure within each of the wheel cylinders 13b, 13c and 13d is controlled to be increased, decreased or maintained by controlling the energization state of the electromagnetic coil of each of the normally-open-type electromagnetic valves 22, 23 and 24 and each of the normally-closed-type electromagnetic valves 26, 27 and 28, as is the case with the above-mentioned control of the first normally-open-type electromagnetic valve 21 and the first normally-closed-type electromagnetic valve 25. Additionally, the energization and non-energization of the electromagnetic coil of each of the normally-open-type electromagnetic valves 21, 22, 23 and 24 and the normally-closed-type electromagnetic valves 25, 26, 27 and 28 is controlled independently from each other in response to the control signal from the ECU 14. As a result, the hydraulic pressure supplied to each of the wheel cylinders 13a, 13c and 13d is controlled independently from each other.

The wheel cylinders 13a, 13b, 13c and 13d are configured with the wheel cylinder 13a provided at the front-right wheel FR, the wheel cylinder 13b provided at the front-left wheel FL, the wheel cylinder 13c provided at the rear-right wheel RR and the wheel cylinder 13d provided at the rear-left wheel RL. Each of the wheel cylinders 13a, 13b, 13c and 13d converts the hydraulic pressure outputted from each of the respective conduits 18a, 18b, 19a and 19b into the braking force. Further, each of the wheel cylinders 13a, 13b, 13c and 13d applies the braking force to each of the wheels FR, FL, RR and RL in response to the hydraulic pressure.

The wheel speed sensor SE is configured with the FR wheel speed sensor SE1 provided at the front-right wheel FR, the FL wheel speed sensor SE2 provided at the front-left wheel FL, the RR wheel speed sensor SE3 provided at the rear-right wheel RR and the RL wheel speed sensor SE4 provided at the rear-left wheel RL. The wheel speed detected by each of the wheel speed sensors SE1, SE2, SE3 and SE4 is transmitted to the ECU 14.

The ECU 14 is a control device that controls actuation and operation of each component of the hydraulic pressure control apparatus 12 by transmitting the control signal to the motor M and each of the electromagnetic valves 21, 22, 23, 24, 25, 26, 27 and 28 of the hydraulic pressure controlling apparatus 12 on the basis of signals outputted from the brake switch SW and the wheel speed sensors SE1, SE2, SE3 and SE4.

Figure 2:
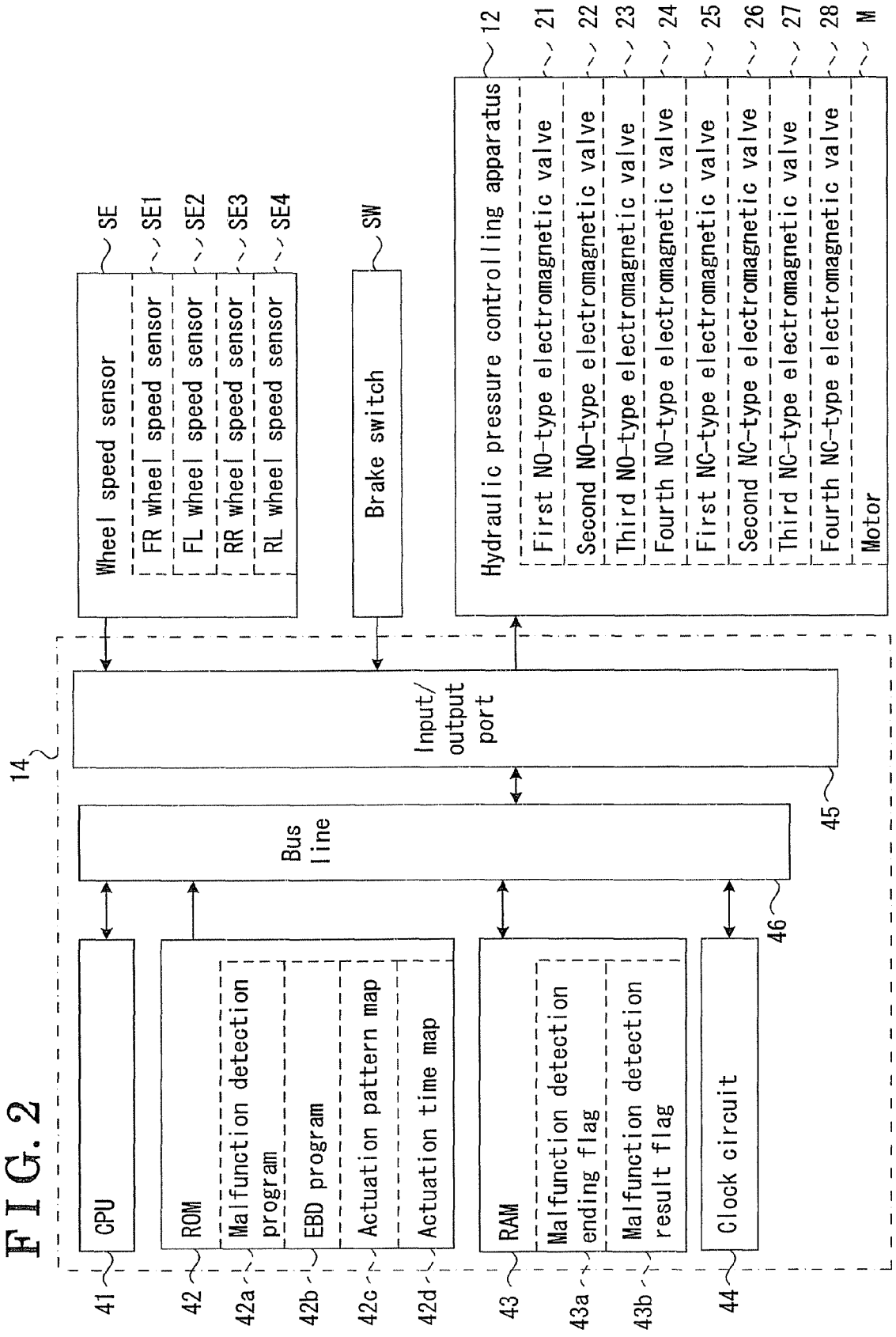
FIG. 2 is a block diagram illustrating an electrical configuration of an ECU.

A detailed configuration of the ECU 14 will be described below in accordance with FIG. 2. FIG. 2 is a block diagram illustrating an electrical configuration of the ECU 14. As illustrated in FIG. 2, the ECU 14 includes a central processing unit (CPU) 41, a read only memory (ROM) 42, a random access memory (RAM) 43, a clock circuit 44 and an input/output port 45, which are connected to each other via a bus line 46. The first, second, third and fourth normally-open-type electromagnetic valves 21, 22, 23 and 24, the first, second, third and fourth normally-closed-type electromagnetic valves 25, 26, 27 and 28 and the motor M, that are provided at the hydraulic pressure controlling apparatus 12, the wheel speed sensors SE (the FR wheel speed sensor SE1, the FL wheel speed sensor SE2, the RR wheel speed sensor SE3 and the RL wheel speed sensor SE4) and the brake switch SW are connected to the input/output port 45.

The CPU 41 is a calculation device that controls each component of the hydraulic pressure controlling apparatus 12 connected to the input/output port 45 in accordance with a program, a data and the like stored in the ROM 42, the RAM 43 and the like, the signals outputted from the brake switch SW, the wheel speed sensor SE and the like connected to the input/output port 45.

The ROM 42 is a non-rewritable memory that stores various programs executed by the CPU 41 and fixed values to be referred to when these programs are run by the CPU 41. The ROM 42 stores therein a malfunction detection program 42a for controlling the CPU 41 to execute a malfunction detection process illustrated in a flowchart of FIG. 5, an electronic brake force distribution program 42b (hereinafter referred to as an EBD program 42b) for controlling the CPU 41 to execute an electronic brake force distribution (EBD) process illustrated in a flowchart of FIG. 6, and an actuation pattern map 42c and an actuation time map 42d to be referred to when the malfunction detection program 42a is executed. The actuation pattern map 42c is referred to in order to determine an actuation pattern of the corresponding electromagnetic valves provided at the brake circuit to which the subject wheel is connected. Further, the actuation time map 42d is referred to in order to determined an actuation time of the corresponding electromagnetic valves. The detailed description of the actuation pattern map 42c and the actuation time map 42d will be given below in more detail.

In a case where the braking force applied to each of the wheels FR, FL, RR and RL by each of the wheel cylinders 13a, 13b, 13c and 13d is increased, the malfunction detection program 42a controls the hydraulic pressure controlling apparatus 12 so as to decrease or maintain the hydraulic pressure applied to a wheel cylinder (hereinafter referred to as a wheel cylinder (W/C) pressure) of a malfunction test subject wheel (hereinafter referred to as a subject wheel) for a predetermined time, and while such control is executed, the malfunction detection program 42a detects whether or not the malfunction of the braking force occurs at the subject wheel on the basis of changes of the wheel speed of the subject wheel.

In this embodiment, the CPU 41 executes the malfunction detection program 42a before the EBD control is executed in a case where an EBD control condition is satisfied in the EBD program 42b that will be described below. Then, the CPU 41 reflects the malfunction detection results of the subject wheel on a malfunction detection result flag 43b, which will be described below, and ends the malfunction detection program 42a. Additionally, in this embodiment, the front-right wheel FR, is set as the subject wheel, and the malfunction detection is executed on the circuit for the front wheels FR and FL, i.e. the brake circuit for the front-wheels, to which the braking control is executed by way of the first hydraulic circuit 18.

The EBD program 42b is a program for executing the EBD control. The EBD control is a control for, for example, restricting the W/C pressures of the wheel cylinder 13c of the rear-right wheel RR and the wheel cylinder 13d of the rear-left wheel RL in a case where a predetermined slips occur at the rear-wheels RR and RL. In addition, there exists known EBD controls such as an EBD control for regulating increases of the W/C pressures of the wheel cylinder 13c of the rear-right wheel RR and the wheel cylinder 13d of the rear-left wheel RL in a case where, for example, a value of a pressure gauge (not illustrated) provided at the second outlet port 17b of the master cylinder 17 (hereinafter referred to as a master cylinder (M/C) pressure) becomes equal to or greater than a predetermined hydraulic pressure, or in a case, for example, where the predetermined slips occur at the rear-wheels RR and RL and the M/C pressure becomes equal to or greater than the predetermined hydraulic pressure. Generally, accompanied by load shift when braking, the rear wheels RR and RL are locked before the front-wheels FR and FL are locked. However, by employing such EBD control, the rear wheels RR and RL are prevented from being locked before the front-wheels FR and RL are locked.

The EBD program 42b is executed by the CPU 41 at every predetermined time interval (e.g. at every 10 milliseconds). Firstly, it is determined whether or not the EBD control condition is satisfied (e.g. whether or not the predetermined slips occur at the rear wheels RR and RL). In a case where the ECU 14 determines that the EBD control condition is satisfied, the ECU 14 runs the malfunction detection program 42a to execute the malfunction detection on the front-wheels FR and FL. Then, in a case where the ECU 14 determines that there is no malfunction occurs at the brake circuit for the front-wheels FR and FL, the EBD control is executed. On the other hand, in a case where the ECU 14 determines that malfunction occurs at the brake circuit for the front-wheels FR and FL, the ECU 14 prohibits the EBD control and ends the program.

A malfunction detection principle of the malfunction detection program 42a will be described below in reference to FIG. 3. FIG. 3 is a diagram for explaining the malfunction detection principle of the malfunction detection program 42a in a case where the front-right wheel FR is set as the subject wheel. More specifically, FIG. 3A illustrates a case where the brake circuit 18a for the front-right wheel FR is not malfunctioning. On the other hand, FIG. 3B illustrates a case where the brake circuit 18b for the front-right wheel FR is malfunctioning.

As illustrated in FIG. 3, the M/C pressure of the master cylinder 17, the W/C pressure of the wheel cylinder 13a provided at the front-right wheel FR (hereinafter referred to as a front-wheel W/C pressure) and the W/C pressures of the wheel cylinders 13c, 13d provided at the respective rear-wheels RR and RL (hereinafter referred to as a rear-wheel W/C pressure) are represented in the explanatory views as graphs where a horizontal axis represents time and a vertical axis represents the hydraulic pressure. Further, in FIG. 3, the wheel speed of the front-right wheel FR detected by the FR wheel speed sensor SE1 (hereinafter referred to as a front-wheel speed), the wheel speeds of the rear-right wheel RR, and the rear-left wheel RL detected by the respective RR wheel speed sensor SE3 and the RL wheel speed sensor SE4 (hereinafter referred to as a rear-wheel speed) and a vehicle speed calculated on the basis of values of the wheel speed sensor SE are represented in FIG. 3 as a graph where a horizontal axis represents time and a vertical axis represents speed. Furthermore, a graph where a horizontal axis represents time and a vertical axis represents a vehicle deceleration, calculated on the basis of the vehicle speed, and a graph where a horizontal axis represents time and a vertical axis represents temporal changing amount of the vehicle deceleration (i.e. an amount of vehicle deceleration changes) are illustrated in each of FIGS. 3A and 3B. Furthermore, a period, through which an actuation control is executed relative to each of the electromagnetic valves 21, 22, 23, 24, 25, 26, 27 and 28 of the hydraulic pressure controlling apparatus 12 in order to detect malfunction of the brake circuit for the subject wheel, is illustrated in a category of the test actuation. The test actuation refers to an operation of testing the braking force by actuating the electromagnetic valves that is provided at the brake circuit to which the subject wheel is connected in order to detect the malfunctioning state thereof.

The case where the brake circuit 18a for the front-right wheel FR is not malfunctioning will be explained below in reference to FIG. 3A. When the depressing force is applied to the brake pedal 15, the M/C pressure is generated by the master cylinder 17 and the hydraulic pressure is increased. In a case where each of the electromagnetic valves 21, 22, 23, 24, 25, 26, 27 and 28 is not energized while the M/C pressure is generated and the hydraulic pressure is increased, the front-wheel W/C pressure and the rear-wheel W/C pressure are increased in response to an increase of the M/C pressure by the hydraulic pressure controlling apparatus 12. As a result, the front-wheel W/C pressure and the rear-wheel W/C pressure decelerate the front-wheel speed and the rear-wheel speed, respectively, thereby decelerating the vehicle speed. Additionally, as the load shifts towards the front-wheels when braking, the rear-wheel speed decelerates more quickly than the front-wheel speed.

Then, while each W/C pressure is increased, the ECU 14 controls the first normally-open-type electromagnetic valve 21 and the first normally-closed-type electromagnetic vale 25 to be energized in order to decrease the front-wheel W/C pressure for a predetermined time, i.e. for the period during which the test actuation is active, or the ECU 14 controls only the first normally-open-type electromagnetic valve 21 to be energized in order to maintain the front-wheel W/C pressure for the predetermined time. As a result, the braking force applied to the front-right wheel FR during the predetermined time is decreased or maintained. Hence, the front-wheel speed increases so as to follow the vehicle speed.

The case where the brake circuit 18a for the front-right wheel FR is malfunctioning will be explained below in reference to FIG. 3B. As is the case with FIG. 3A, when the depressing force is applied to the brake pedal 14, the M/C pressure is generated by the master cylinder 17 and the hydraulic pressure is increased. However, as the brake circuit 18a for the front-right wheel FR is malfunctioning, even if each of the electromagnetic valves 21, 22, 23, 24, 25, 26, 27 and 28 are not energized, the hydraulic pressure is not transmitted to the front-wheel W/C pressure, and only the rear-wheel W/C pressure is increased in response to the M/C pressure. The above-mentioned situation occurs even if the ECU 14 controls the first normally-open-type electromagnetic valve 21 and the first normally-closed-type electromagnetic valve 24 so as to decrease or maintain the front-wheel W/C pressure for the period during which the test actuation is active. As a result, the vehicle speed decreases in response to a decrease of the rear-wheel speed. Then, the front-wheel speed follows the vehicle speed and continuously decelerates in response to the vehicle speed.

Accordingly, in a case where the FR wheel speed sensor SE1 detects changes of the front-wheel speed while the test actuation is active and where changes towards acceleration is detected at the front-wheel speed, the ECU 14 determines that there is no malfunction occurring at the brake circuit 18a for front-right wheel FR. On the other hand, in a case where the changes towards the acceleration are not detected at the front-wheel speed, the ECU 14 determines that the malfunction occurs at the brake circuit 18a for front-right wheel FR.

The determination of the ECU 14 that the malfunction does not occur at the brake circuit for the front-right wheel FR indicates that the fluid leakage does not occur at the first hydraulic circuit 18. Therefore, the malfunction does not occur at the brake circuit 18b for front-left wheel FL provided with the wheel cylinder 13b that is connected to the first hydraulic circuit 18. Accordingly, the front-wheels FR and FL are in a state where the braking force is appliable thereto. Hence, as illustrated in FIG. 3A, the EBD control is executed in order to restrict the increase of the rear-wheel W/C pressure and further in order to prevent the rear-wheels RR and RL, from being locked before the front-wheels FR and FL.

On the other hand, the determination of the ECU 14 that the malfunction occurs at the brake circuit 18a for front-right wheel FR indicates that the fluid leakage occurs at the first hydraulic circuit 18 and that the brake circuit 18b for the front-left wheel FL, is also malfunctioning. In other words, the front-wheels FR and FL are in a state where the braking force is not appliable thereto. Therefore, as illustrates in FIG. 3B, the EBD control is not executed and the rear-wheel W/C pressure is increased in response to the M/C pressure. As a result, the vehicle is safely stopped.

The malfunction detection principle of the malfunction detection program 42a is described above with the front-right wheel FR as the subject wheel, however, even in a case where the front-left wheel FL is set as the subject wheel, the malfunction detection is executed by the same principle, and further the ECU 14 is capable of determining whether or not to execute the EBD control. Additionally, the malfunction detection may be executed by the same principle in a case where the rear-right wheel RR or the rear-left wheel RL is set as the subject wheel.

Returning to FIG. 2, further explanation of the configuration of the ECU 14 will be given below. The actuation pattern map 42c is a map for setting an actuation pattern (i.e. a pressure decrease or a pressure maintenance) of the corresponding electromagnetic valves that controls the W/C pressure of the subject wheel and the actuation time map 42d is a map for setting an actuation time of the corresponding electromagnetic valves that in order to execute the malfunction detection by the CPU 41 running the malfunction detection program 42a. The actuation pattern and the actuation time are set in reference to the actuation pattern map 42c and the actuation time map 42d, respectively, on the basis of a second vehicle speed DV2 and an amount of vehicle speed changes (DV2-DV1) (see FIG. 5) both of which are calculated by the CPU 41.

Figure 4A:
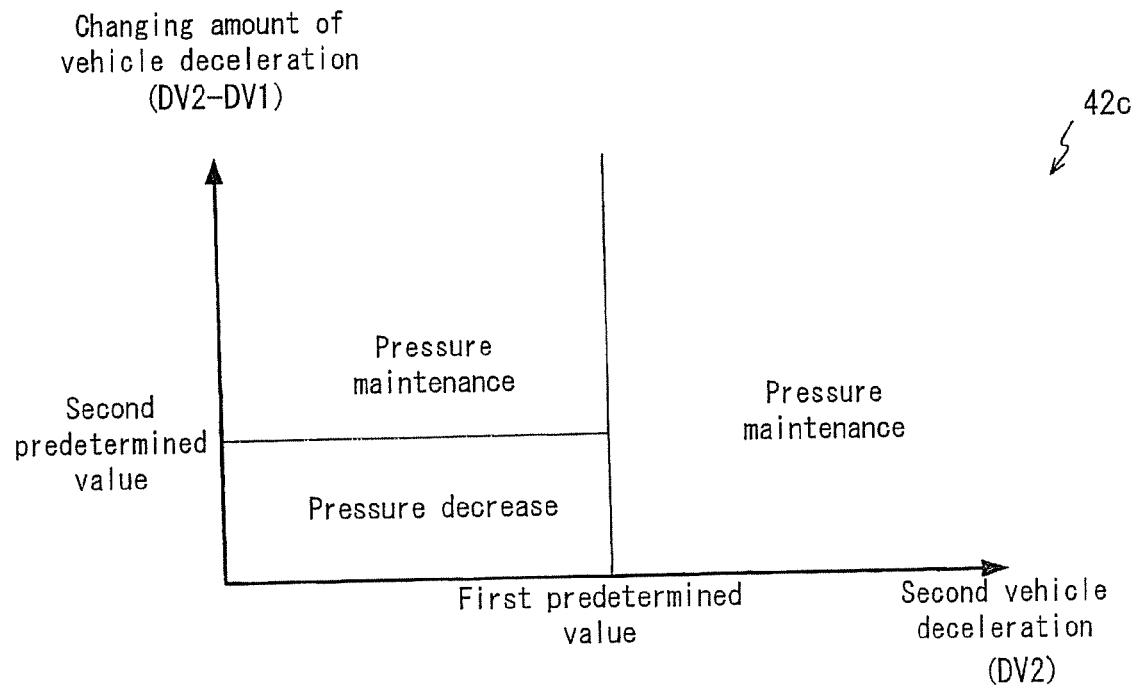
FIG. 4A is a diagram schematically illustrating contents of a actuation pattern map.
Figure 4B:
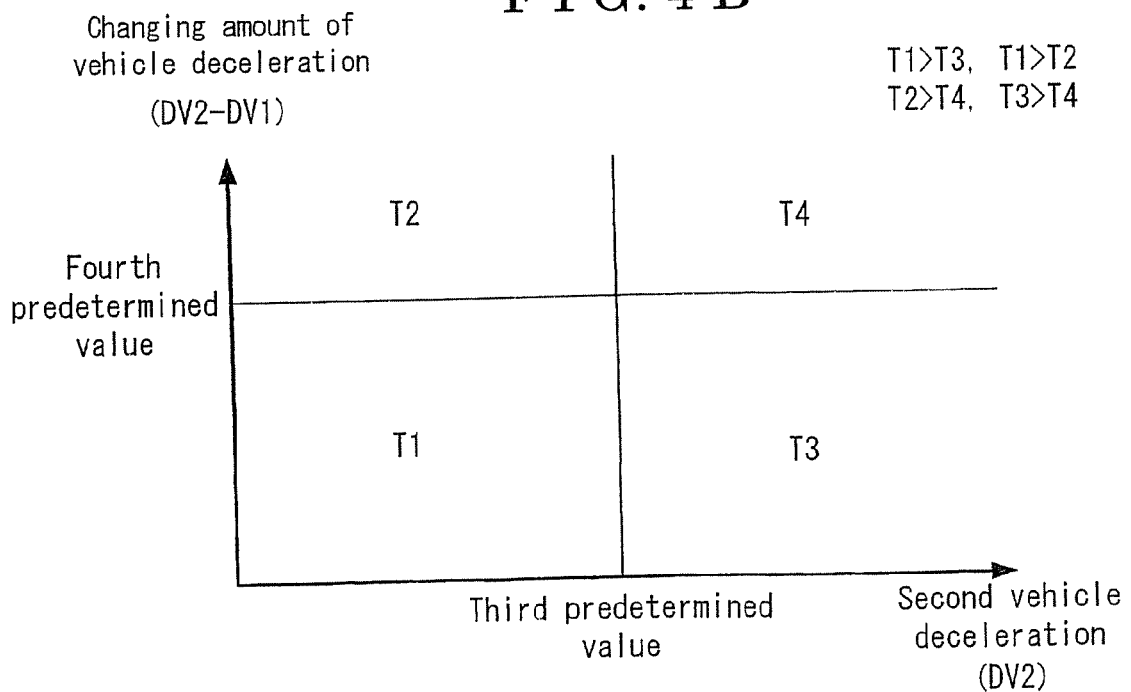
FIG. 4B is a diagram schematically illustrating contents of a actuation time map.

The actuation pattern map 42c and the actuation time map 42d will be described below in reference to FIG. 4. FIG. 4A is a diagram schematically illustrating contents of the actuation pattern map 42c. FIG. 4B is a diagram schematically illustrating contents of the actuation time map 42d.

As illustrated in FIG. 4A, the actuation pattern is set to the "pressure decrease" by referring to the actuation pattern map 42c in a case where a second vehicle deceleration (DV2) is equal to or less than a first predetermined value and the amount of vehicle deceleration changes (DV2-DV1) is equal to or less than a second predetermined value. The actuation pattern is set to the "pressure maintenance" by referring to the actuation pattern map 42c in a case where the second vehicle deceleration (DV2) is equal to or less than a first predetermined value and the amount of vehicle deceleration changes (DV2-DV1) is greater than the second predetermined value. Further, the actuation pattern is set to the "pressure maintenance" by referring to the actuation pattern map 42c in a case where the second vehicle deceleration (DV2) is greater than the first predetermined value. In the case where the actuation pattern is set to the "pressure decrease", the ECU 14 controls the W/C pressure applied to the subject wheel to be decreased by actuating the corresponding electromagnetic valves. On the other hand, in the case where the actuation pattern is set to the "pressure maintenance", the ECU 14 controls the W/C pressure applied to the subject wheel to be maintained by actuating the corresponding electromagnetic valves.

In a case where the vehicle deceleration is low and the amount of the vehicle deceleration changes is small, increases of the front-wheel speed is small because a difference between the vehicle speed and the front-wheel speed is small. Hence, in this case, the actuation pattern is set to the "pressure decrease" by referring to the actuation pattern map 42c. As a result, in the case where the brake circuit for the subject wheel is not malfunctioning, the wheel speed of the subject wheel is surely increased and the malfunction detection is surely executed. Further, as a rate of the braking force decrease is small, the driver may feel less discomfort.

On the other hand, in a case where the vehicle deceleration is great, or in a case where the changes of the vehicle deceleration is great, as the difference between the vehicle speed and the front-wheel speed becomes large, the wheel speed of the subject wheel quickly increases if the malfunction does not occur at the brake circuit for the subject wheel. Hence, the wheel speed of the subject wheel is surely increased even if the actuation pattern is not set as the "pressure decrease" but the "pressure maintenance". Further, in this case, as the degree of the braking force is small, the driver may feel less discomfort.

As described above, the malfunction detection of the braking force is safely and surely executed while preventing the driver from feeling discomfort by setting the actuation pattern in response to the degree of the vehicle deceleration and the degree of changes of the vehicle deceleration on the basis of the actuation pattern map 42c.

On the other hand, as illustrated in FIG. 4B, the actuation time is set to T1 by referring to the actuation time map 42d in a case where the second vehicle deceleration (DV2) is equal to or less than a third predetermined value and where the amount of the vehicle deceleration changes (DV2-DV1) is equal to or less than a fourth predetermined value. The actuation time is set to T2 by referring to the actuation time map 42d in a case where the second vehicle deceleration (DV2) is equal to or less than the third predetermined value and where the amount of the vehicle deceleration changes (DV2-DV1) is greater than the fourth predetermined value.

Further, the actuation time is set to T3 by referring to the actuation time map 42d in a case where the second vehicle deceleration (DV2) is greater than the third predetermined value and where the amount of the vehicle deceleration changes (DV2-DV1) is equal to or less than the fourth predetermined value. The actuation time is set to T4 by referring to the actuation time map 42d in a case where the second vehicle deceleration (DV2) is greater than the third predetermined value and where the amount of the vehicle deceleration changes (DV2-DV1) is greater than the fourth predetermined value.

Additionally, in the actuation time map 42d, the actuation time T1 is set to be longer than T3, and the actuation time T2 is set to be longer than T4. By setting the actuation time for a case where the vehicle deceleration is low (T1, T2) to be longer than the actuation time for a case where the vehicle deceleration is great (T3, T4), the ECU 14 surely detects whether or not the wheel speed of the subject wheel is increased in a case where the vehicle deceleration is low. Hence, the malfunction detection is surely executed. Additionally, even if the actuation time is extended, because the vehicle deceleration is low, the driver may feel less discomfort. On the other hand, in the case where the vehicle deceleration is great, even if the actuation time is shortened, the ECU 14 surely detects whether or not the wheel speed of the subject wheel is increased. Hence, the malfunction detection is surely executed. Further, because the actuation time is short, an increase of a braking distance, caused by decrease of the braking force, is reduced, and the driver may feel less discomfort.

Additionally, in the actuation time map 42d, the actuation time T1 is set to be longer than T2, and the actuation time T3 is set to be longer than T4. As is the case where the actuation time (T1, T2) for the case where the vehicle deceleration is low is set to be longer than the actuation time (T3, T4) for the case where the vehicle deceleration is great, by setting the actuation time (T1, T3) for a case where the amount of the vehicle deceleration changes is small to be longer than the actuation time (T2, T4) for a case where the amount of the vehicle deceleration changes is great, the malfunction detection is surely executed, and further, the driver may feel less discomfort.

As described above, the malfunction detection of the braking force is safely and surely executed while preventing the driver from feeling discomfort by setting the actuation time in response to the degree of the vehicle deceleration and the degree of changes of the vehicle deceleration on the basis of the actuation time map 42d.

Returning to FIG. 2, further description of the ECU 14 will be given below. The RAM 43 is a rewritable and volatile memory for temporarily memorizing a data necessary for the CPU 41 to run each program. A malfunction detection ending flag 43a and a malfunction detection result flag 43b are stored in the RAM 43.

The malfunction detection ending flag 43a is a flag indicating whether or not the malfunction detection by the malfunction detection program 42a is completed. In a case where the malfunction detection is completed, the malfunction detection ending flag 42a is set to zero (0). On the other hand, in a case where the malfunction detection is not completed, the malfunction detection ending flag 42a is set to one (1).

The malfunction detection ending flag 43a is referred to by the malfunction detection program 42a. In a case where the malfunction detection ending flag 43a is set to zero (0) when the malfunction detection program 42a is run, the malfunction detection program 42a executes the malfunction detection and sets the malfunction detection ending flag 43a to one (1). On the other hand, in a case where the malfunction detection ending flag 43a is set to one (1), the malfunction detection program 42a is ended without executing the malfunction detection.

Further, the malfunction detection ending flag 43a is referred to in the EBD program 42b. When the malfunction detection ending flag 43a is set to one (1) in a case where the EBD control condition is satisfied and the malfunction detection program 42a is executed, the ECU 14 determines that the malfunction detection process by the malfunction detection program 42a is completed and determines whether or not to execute the EBD control on the basis of the malfunction detection result flag 43b.

Additionally, zero (0) is set in the malfunction detection ending flag 43a as a default value when an ignition switch (not shown) is turned on. Further, the malfunction detection ending flag 43a is set to zero (0) also in a case where the EBD control condition is not satisfied in the EBD program 42b.

The malfunction detection result flag 43b is a flag for storing a result of the execution of the malfunction detection by the malfunction detection program 42a. In the case where the result indicates that the malfunction does not occur, zero (0) is stored in the malfunction detection result flag 43b, and in the case where the result indicates that the malfunction occurs, one (1) is stored. When the ignition switch is turned on, zero (0) is set in the malfunction detection result flag 43b as the default value. Then, a result is overwritten in the malfunction detection result flag 43b each time when the malfunction detection is executed by the malfunction detection program 42a. Further, the malfunction detection result flag 43b is referred to by the EBD program 42b and the ECU 14 determined whether or not to execute the EBD control on the basis of the malfunction detection result flag 43b.

The clock circuit 44 includes a built-in-clock that ticks the present date and time. The clock circuit 44 is a known circuit that calculates a time by comparing the date and time when the built-in-clock starts ticking and the present date and time.

Figure 5B:
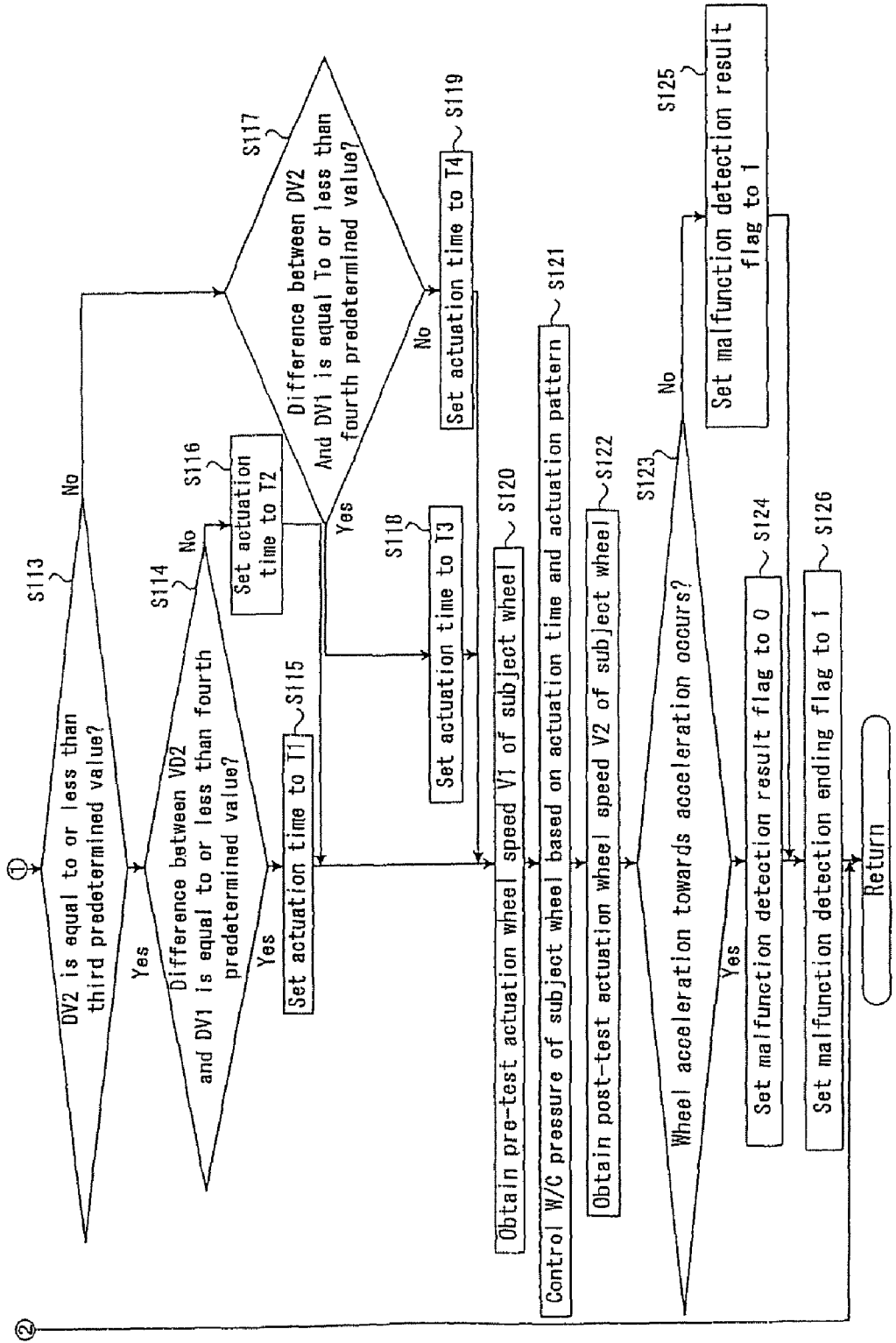
FIG. 5 is a flowchart illustrating a malfunction detection process.

The malfunction detection process executed by the ECU 14 will be described below in reference to FIG. 5. FIG. 5 is the flowchart illustrating the malfunction detection process. The malfunction detection process is executed in the EBD control (see FIG. 2) in a case where the malfunction detection process is not executed when the EBD control condition is satisfied.

In the malfunction detection process, the ECU 14 checks whether the malfunction detection ending flag 43a is set to zero (0) (S101). In a case where the malfunction detection ending flag 43a is set to one (1) (No in S101), the ECU 14 ends the malfunction detection process without executing the malfunction detection because the malfunction detection has already ended. On the other hand, in a case where the malfunction detection ending flag 43a is set to zero (0) (Yes in S101), the process proceeds to S102.

In S102, the ECU 14 checks whether each component connected to the input/output port of the ECU 14 is systematically normal. In other words, the ECU 14 checks whether or not each component connected to the input/output port of the ECU 14 is normally functioning. Further, in a case where an anti-skid control is executed by the hydraulic pressure controlling apparatus 12, the ECU 14 checks whether or not the anti-skid control is normally executable. Then, in a case where each component is not systematically normal (No in S102), the ECU 14 ends the malfunction detection process without executing the malfunction detection. On the other hand, in a case where each component is systematically normal (Yes in S102), the process proceeds to S103.

In S103, the ECU 14 checks whether or not the brake pedal 15 is depressed on the basis of the output signal of the brake switch SW. Then, in a case where the brake pedal 15 is not depressed (No in S103), the ECU 14 ends the malfunction detection process without executing the malfunction detection because the malfunction detection is not accurately executable. On the other hand, in a case where the brake pedal 15 is depressed (Yes in S103), the process proceeds to S104.

In S104, the ECU 14 checks whether other brake control such as the anti-skid control, a traction control and the like is executed. Then, in a case where other brake control is executed (Yes in S104), the ECU 14 ends the malfunction detection process without executing the malfunction detection because the execution of the malfunction detection affects other control. On the other hand, in a case where other brake control is not executed (No in S104), the process proceeds to S105.

In S105, the wheel speed of the malfunction test subject wheel is detected by the corresponding wheel speed sensor. Then, the first vehicle deceleration DV1 is calculated on the basis of the detected wheel speed. The first vehicle deceleration DV1 is temporarily stored in the RAM 43 and is used in the malfunction detection process.

Then, the ECU 14 checks whether or not the first vehicle deceleration DV1 is within a predetermined range (S106). In a case whether the first vehicle deceleration DV1 is not within the predetermined range (No in S106), the ECU 14 ends the malfunction determination process without executing the malfunction detection. As a result, in a case where the vehicle deceleration is very low, a possibility of a false-detection of the malfunction caused because of incapability of detecting the increase of the wheel speed of the target is eliminated. Further, in a case where the vehicle deceleration is very large, an occurrence of a danger in response to the increase of the wheel speed of the subject wheel by the malfunction detection is prevented.

On the other hand, in a case where the ECU 14 determines that the vehicle deceleration DV1 is within the predetermined range by the process of S106 (Yes in S106), the second vehicle deceleration DV2 is calculated on the basis of the wheel speed of the subject wheel after a predetermined time of processing step S105 (S107). The second vehicle deceleration DV2 is temporarily stored in the RAM 43 and is used in the malfunction detection process.

Then, as is the case with the process of S106, the ECU 14 checks whether or not the second vehicle deceleration DV2 is within the predetermined range (S108). In a case where the second vehicle deceleration DV2 is not within the predetermined range (No in S108), the ECU 14 ends the malfunction detection process without executing the malfunction detection. A lower limit of the predetermined range for the second vehicle deceleration DV2 is set to the vehicle deceleration DV1. In a case where the braking force applied to the subject wheel increases, the vehicle deceleration increases. Therefore, the ECU 14 is capable of determining whether or not the braking force applied to the subject wheel increases. Then, in a case where the second vehicle deceleration DV2 is equal to or less than the first vehicle deceleration DV1, the ECU 14 determines that the second vehicle deceleration DV2 is not within the predetermined range (No in S108). On the other hand, in a case where the second vehicle deceleration DV2 is within the predetermined range (Yes in S108), the process proceeds to S109, and the ECU 14 executes the malfunction detection by setting the actuation pattern and the actuation time of the corresponding electromagnetic valves for controlling the W/C pressure applied to the subject wheel when the malfunction detection is executed.

In the processes of S109, S110, S111 and S112, the actuation pattern of the corresponding electromagnetic valves is set on the basis of the actuation pattern map 42c that is illustrated in FIG. 4A in order to control the W/C pressure applied to the subject wheel in the case where the malfunction detection is executed.

More specifically, in the process of S109, the ECU 14 checks whether or not the second vehicle deceleration DV2 is equal to or less than the first predetermined value. Hence, the actuation pattern map 42c is divided into patterns by the second vehicle deceleration DV2.

In a case where the second vehicle deceleration DV2 is equal to or less than the first predetermined value (Yes in S109), the ECU 14 calculates a difference between the second vehicle deceleration DV2 and the first vehicle deceleration DV1, and checks whether or not the calculated difference is equal to or less than the second predetermined value (S110). The difference between the second vehicle deceleration DV2 and the first vehicle deceleration DV1 represents an amount of the vehicle deceleration changes. Hence, in the process of S101, the actuation pattern of the actuation pattern map 43c in the case where the second vehicle deceleration DV2 is equal to or less than the first predetermined value is divided into patterns by the changes of vehicle deceleration (DV2-DV1).

Then, in a case where the difference between the first and second vehicle decelerations DV1 and DV2 is equal to or less than the second predetermined value (Yes in S110), the ECU 14 sets the actuation pattern to the "pressure decrease" on the basis of the actuation pattern map 42c (S111), and then, the process proceeds to S113.

On the other hand, in a case where the second vehicle deceleration DV2 is greater than the first predetermined value (No in S109), and in a case where the difference between the first and second vehicle decelerations DV1 and DV2 is greater than the second predetermined value (No in S110), the ECU 14 sets the actuation pattern to the "pressure maintenance" on the basis of the actuation pattern map 42c (S112), then, the process proceeds to S113.

Then, in processes of S113, S114, S115, S116, S117, S118 and S119, the ECU 14 sets the actuation time of the corresponding electromagnetic valves for controlling the W/C pressure, applied to the subject wheel in the case where the malfunction detection is executed, on the basis of the actuation time map 42d that is illustrated in FIG. 4B.

In the process of S113, the ECU 14 checks whether or not the second vehicle deceleration DV2 is equal to or less than the third predetermined value. In a case where the second vehicle deceleration DV2 is equal to or less than the third predetermined value (Yes in S113), the process proceeds to S114. On the other hand, in a case where the second vehicle deceleration DV2 is greater than the third predetermined value (No in S113), the process proceeds to S117. Accordingly, the actuation time map 42d, illustrated in FIG. 4B, is divided into patterns by the second vehicle deceleration DV2.

In the process of S114, the ECU 14 calculates the difference between the second vehicle deceleration DV2 and the first vehicle deceleration DV1, i.e. the amount of the vehicle deceleration changes, and checks whether or not the calculated difference is equal to or less than the fourth predetermined value. By the process of S114, the actuation time of the actuation time map 42d, illustrated in FIG. 4B, in the case where the second vehicle deceleration DV2 is low, is divided into patterns by the amount of the vehicle deceleration changes (DV2-DV1).

Then, in a case where the difference between the first and second vehicle decelerations DV1 and DV2 is equal to or less than the fourth predetermined value (Yes in S114), the ECT 14 sets the actuation time to T1 on the basis of the actuation time map 42d (S115). On the other hand, in a case where the difference between the first and second vehicle decelerations DV1 and DV2 is greater than the fourth predetermined value (No in S114), the ECT 14 sets the actuation time to T2 on the basis of the actuation time map 42d (S116).

Further, in the process of S117, as is the case with the process of S114, the ECU 14 calculates the difference between the second vehicle deceleration DV2 and the first vehicle deceleration DV1, i.e. the changes of the vehicle deceleration, and checks whether or not the calculated difference is equal to or less than the fourth predetermined value. Accordingly, the actuation time of the actuation time map 42d, illustrated in FIG. 4B, in the case where the second vehicle deceleration DV2 is great, is divided into pattern by the amount of the vehicle deceleration changes (DV2-DV1).

Then, in a case where the difference between the first and second vehicle decelerations DV1 and DV2 is equal to or less than the fourth predetermined value (Yes in S117), the ECU 14 sets the actuation time to T3 on the basis of the actuation time map 42d (S118). On the other hand, in a case where the difference between the first and second vehicle decelerations DV1 and DV2 is greater than the fourth predetermined value (No in S117), the ECU 14 sets the actuation time to T4 on the basis of the actuation time map 42d (S119).

After any one of the steps S115, S116, S117, S118 and S119 is executed, the ECU 14 obtains a wheel speed V1 of the subject wheel before test actuation (hereinafter referred to as pre-test actuation subject wheel speed V1) from the wheel speed sensor before the W/C pressure applied to the subject wheel is controlled by the actuation of the corresponding electromagnetic valves (S120). The pre-test actuation subject wheel speed V1 is temporarily stored in the RAM 43 and is referred to in a subsequent step S123.

Following to the process of S120, the ECU 14 controls the W/C pressure of the subject wheel by actuating each of the electromagnetic valves 21, 22, 23, 24, 25, 26, 27 and 28 of the hydraulic pressure controlling apparatus 12 in accordance with the actuation pattern and the actuation time set by steps S109 to S119 (S121). The actuation time is clocked by the clock circuit 44. Then, after the actuation time set by the processes of S115 to S119 is clocked by the clock circuit 44, the process proceeds to S122.

In the process of S122, the ECU 14 obtains a wheel speed V2 of the subject wheel after test actuation (hereinafter referred to as a post-test actuation subject wheel speed V2) from the corresponding wheel speed sensor. Then, the ECU 14 checks whether or not wheel acceleration towards acceleration occurs by comparing the post-test drive subject wheel speed V2 and the pre-test actuation subject wheel speed V1 that is temporarily stored in RAM 43 (S123). In a case where the ECU 14 determines that the wheel acceleration towards acceleration occurs (Yes in S123), the ECU 14 determines that the malfunction does not occur at the brake circuit for the subject wheel because the wheel speed increases by the actuation control executed at the process of S121 and sets the malfunction detection result flag 43b to zero (0) (S123). Then, the process proceeds to S126. The case where the wheel acceleration towards acceleration is not detected indicates a state where the wheel speed generated in the case where the wheel is controlled on the basis of the test actuation pattern continuously changes at the same gradient as the changes of the wheel speed in the case where the wheel is not controlled on the basis of the test actuation pattern. On the other hand, the case where the wheel acceleration towards acceleration is detected indicates a state where a gradient of the decrease of the wheel speed becomes gentle, a state where the wheel speed becomes constant or a state where the wheel speed increases.

On the other hand, in a case where the ECU 14 determines that the wheel acceleration towards acceleration does not occur (No in S123), the ECU 14 determines that the malfunction occurs at the brake circuit for the subject wheel because the wheel speed continuously decreases even when the control of the process S121 is executed and sets the malfunction detection result flag 43b to one (1) (S125). Then, the process proceeds to S126.

In the process of S126, the ECU 14 sets the malfunction detection ending flag 43a to one (1) and ends the malfunction detection process.

As described above, the W/C pressure applied to the subject wheel is decreased or maintain for a time indicated by the actuation time by executing the malfunction detection process illustrated in FIG. 5. The malfunction is accurately detected by detecting changes of the wheel speed of the subject wheel during the time indicated by the actuation time. Further, as the brake control apparatus of the embodiment detects the malfunction of the braking force from the changes of the wheel speed of the malfunction test subject wheel, the brake control apparatus of the embodiment eliminates an effect of differences of the wheel speed caused in the case of the known brake control apparatus where the speed of two wheels are compared. Accordingly, the brake control apparatus of the embodiments accurately detects the malfunction of the braking force.

Further, in the process of S108, the lower limit of the predetermined range for the second vehicle deceleration DV2 is set at the first vehicle deceleration DV1. In a case where the second vehicle deceleration DV2 is at least greater than the first vehicle deceleration DV1, i.e. in the case where the braking force applied to the subject wheel increases, the W/C pressure applied to the subject wheel is decreased or maintained for the time indicated by the actuation time by the processes following S108. Hence, if the brake circuit for the subject wheel is not malfunctioning, the wheel speed of the subject wheel surely changes towards acceleration by decreasing or maintaining the W/C pressure applied to the subject wheel. Accordingly, the malfunction detection is accurately executed. Further, as the malfunction detection is executed in the case where the braking force applied to the subject wheel increases, the malfunction detection is executable if the W/C pressure applied relative to the subject wheel is at least maintained. Accordingly, if the ECU 14 controls the W/C pressure applied relative to the subject wheel to be maintained when executing the malfunction detection, the degree of the decrease of the braking force at the subject wheel is controlled to be smaller, compared to the case where the W/C pressure applied relative to the subject wheel is controlled to be decreased. Hence, the driver may feel less discomfort even when the malfunction detection is executed.

Figure 6:
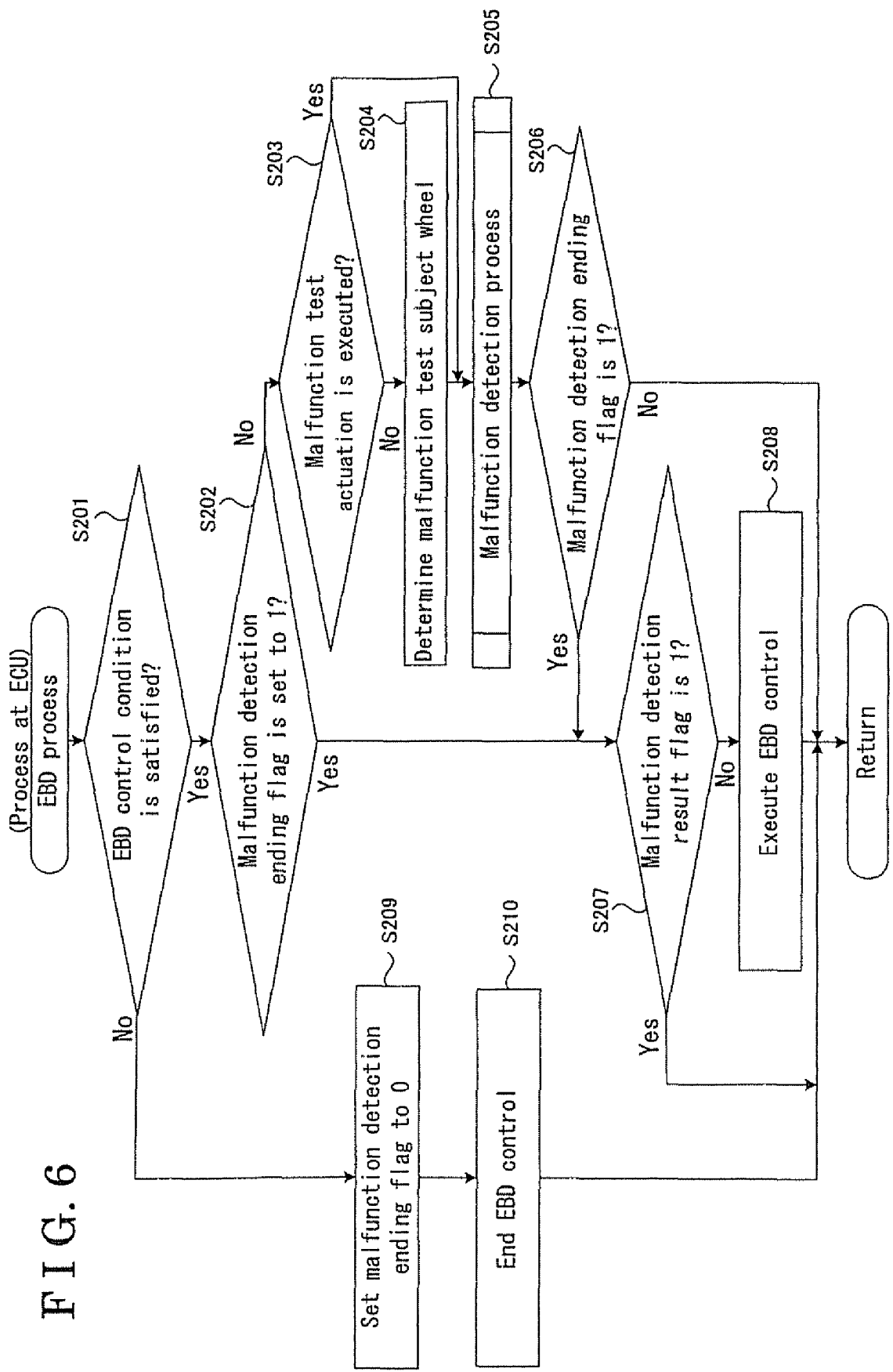
FIG. 6 is a flowchart illustrating an EBD process.

An EBD process executed by the ECU 14 will be described below in reference to FIG. 6. FIG. 6 is the flowchart illustrating the EBD process. The EBD process is executed by the CPU 41 running the EBD program 42b at every predetermined time interval (e.g. at every 10 milliseconds).

In the EBD process, the ECU 14 checks whether or not the EBD control condition is satisfied (S201). For example, the ECU 14 determines whether or not the predetermined slips occur at the rear-wheels RR and RL on the basis of the wheel speed of each of the wheels FR, FL, RR and RL detected by the corresponding wheel speed sensor SE. In the case where the predetermined slips occur at the rear-wheels RR and RL, the ECU 14 determines that the EBD control condition is satisfied. In other cases, the EUC 14 determines that the EBD control condition is not satisfied.

In a case where the EBD control condition is not satisfied (No in S201), the ECU 14 sets the malfunction detection ending flag 43a to zero (0) (S209). As a result, the malfunction detection process is executed before the EBD control condition is satisfied and the EBD control is executed. Then, the ECU 14 ends the EBD control (S210) and ends the EBD process. Generally, the EBD control condition varies in cases. For example, an EBD control starting condition in the case where the EBD control is not executed differs from an EBD control ending condition in the case where the EBD control is executed.

On the other hand, in the case where the EBD control condition is satisfied (Yes in S201), the ECU 14 checks whether the malfunction detection ending flag 43a is set to one (1) (S202). In a case where the malfunction detection ending flag 43a is set to zero (0) (No in S202), the ECU 14 further checks whether the actuation test is executed relative to the hydraulic pressure controlling apparatus 12 (S203). In a case where the actuation test is not executed relative to the hydraulic pressure controlling apparatus 12 (No in S203), the ECU 14 determines a malfunction test subject wheel (S204) from the wheels FR, FL, RR and RL. In the embodiment, the front-right wheel FR is set as the subject wheel, and then, the ECU 14 runs the malfunction detection program 42a in order to execute the malfunction detection process (S205).

On the other hand, in a case where the actuation test is executed relative to the hydraulic pressure controlling apparatus 12 (Yes in S203), the ECU 14 skips the process of S204 and executes the malfunction detection process (S205). Then, the process proceeds to S206.

In the process of S206, the ECU 14 checks whether the malfunction detection ending flag 43a is set to one (1). Then, in a case where the malfunction detection ending flag 43a is set to zero (0) (No in S206), the ECU 14 once ends the EBD process because the malfunction detection is not completed. Additionally, even if the malfunction process is ended at S206, the determination process of the malfunction detection ending flag 43a is re-executed by the EBD process of the next timing (e.g. after 10 milliseconds) (S202 and S206).

On the other hand, in the case where the malfunction detection ending flag 43a is determined to be set to one (1) as results of the determinations at the process of S202 and the process of S206 (Yes in S202 and Yes in S206), the ECU 14 determines that the malfunction detection by the malfunction detection process is completed. Therefore, the ECU 14 checks whether the malfunction detection result flag 43b, to which the result of the malfunction detection is stored, is set to one (1) (S207).

In a case where the malfunction detection result flag 43b is set to zero (0) (No in S207), the ECU 14 executes the EBD control (S208) because the malfunction does not occur at the brake circuit 18 for the front-wheels FR and FL. Accordingly, the increase of the W/C pressures of the rear-wheels RR and RL are restricted, thereby preventing the rear-wheels RR and RL from slipping. Then, the ECU 14 ends the EBD process.

On the other hand, in a case where the malfunction detection result flag 43b is set to one (1) (Yes in S207), the ECU 14 does not execute the process of S209 (i.e. the EBD control) because the malfunction occurs at the first hydraulic circuit 18 to which the front-wheels FR and FL are connected. Accordingly, in a case where the brake circuit 18 for the front-wheels FR and FL are malfunctioning, the W/C pressures applied to the rear-wheels RR and RL are increased, thereby stopping the vehicle safely. Then, the ECU 14 ends the EBD process.

Figure 7:
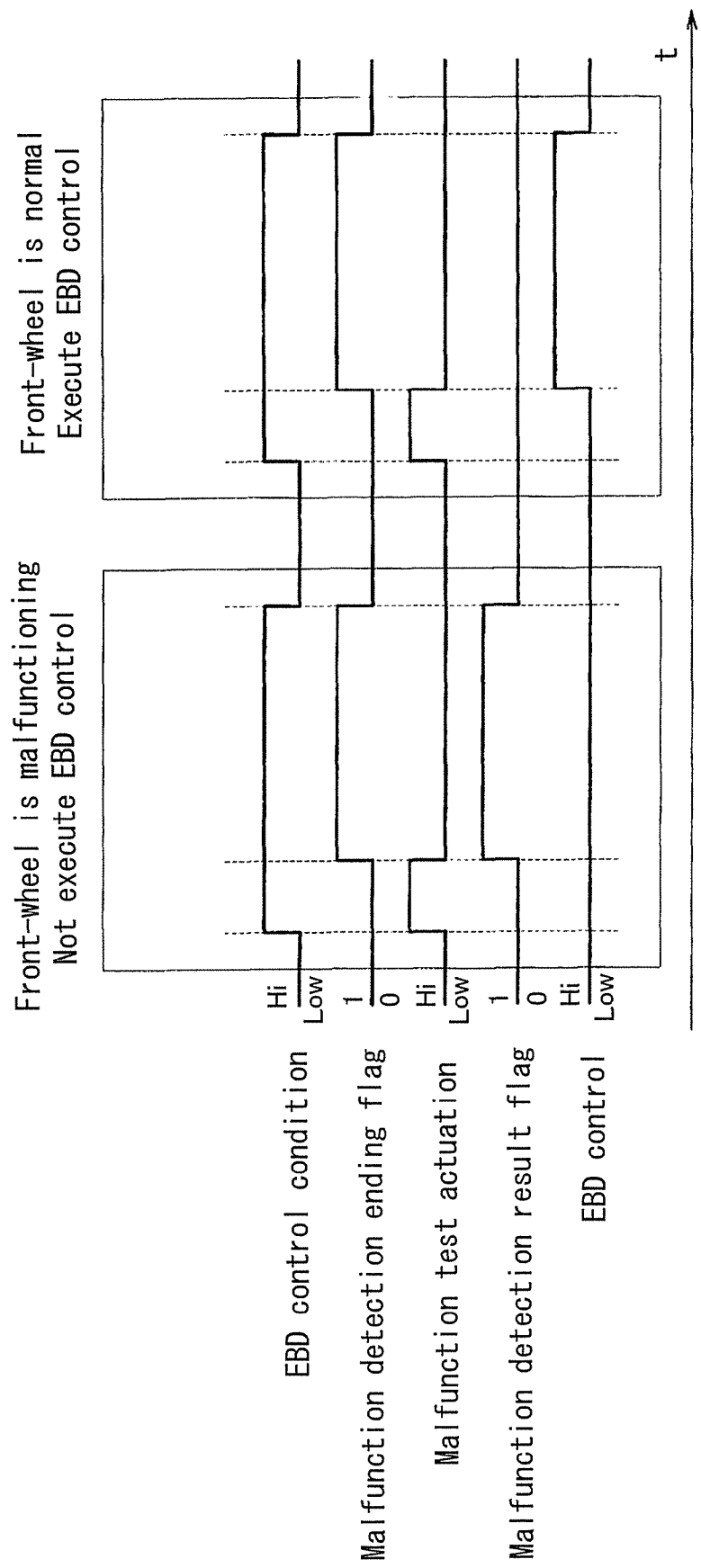
FIG. 7 is a timing diagram for the EBD process.

Each process in the EBD process (see FIG. 6) and a timing of changes of the flags 43a and 43b are described below in reference to FIG. 7. FIG. 7 is a timing diagram illustrating timings of each process and changes of the flags 43a and 43b when the EBD process is executed. FIG. 7 illustrates the case where the brake circuit 18 for the front-wheels FR and FL are malfunctioning and the case where the brake circuit 18 for the front-wheels FR and FL is normal. Further, the timing diagram of FIG. 7 contains rows indicating the EBD control condition indicating whether or not the EBD control condition is satisfied, the malfunction detection ending flag 43a, the malfunction test actuation indicating whether or not the malfunction test actuation is executed, the malfunction detection result flag 43b and the EBD control indicating whether or not the EBD control is executed. The horizontal axis of the timing diagram represents time t.

The state where the EBD control condition is satisfied is represented by "Hi". On the other hand, the state where the EBD is not satisfied is represented by "Low". Further, the state where the malfunction test actuation is executed is represented by "Hi", and the sate where the malfunction test actuation is not executed is represented by "Low". The state where the EBD control is executed is represented by "Hi", and on the other hand, the state where the EBD control is not executed is represented by "Low".

When the above-described EBD control (see FIG. 6) is started and the EBD control condition is satisfied in the process of S201 illustrated in FIG. 6 under the condition where the brake circuit 18 for the front-wheels FR and FL are malfunctioning, the malfunction detection process is executed at S205 of FIG. 6 and the malfunction test actuation is started in a case where the malfunction test actuation is not executed. Then, when the malfunction test actuation ends, the malfunction detection result flag 43b is set to one (1) and further, the malfunction detection ending flag 43a is set to one (1) by the malfunction detection process. In the EBD process, when the ECU 14 checks that the malfunction detection ending flag 43a is set to one (1) at the process of S202 or S206 illustrated in FIG. 6, the ECU 14 checks a content of the malfunction detection result flag 43b at the process of S207 illustrated in FIG. 6. Then, in this case, as the malfunction detection result flag 43b is set to one (1), the EBD control is not executed and the ECU 14 ends the EBD process.

On the other hand, as is the case where the brake circuit 18 for the front-wheels FR and FL are malfunctioning, when the above-mentioned EBD process (see FIG. 6) is started and the EBD control condition is satisfied in the process of S201 illustrated in FIG. 6 under the condition where the brake circuit 18 for the front-wheels FR and FL is normal, the malfunction detection process is executed at S205 of FIG. 6 and the malfunction test actuation is started in a case where the malfunction test actuation is not executed. Then, when the malfunction test actuation ends, the malfunction detection result flag 43b is set to zero (0) and further, the malfunction detection ending flag 43a is set to one (1) by the malfunction detection process. Then, in the EBD process, the ECU 14 checks that the malfunction detection ending flag 43a is set to one (1) at the process of S202 or S206 illustrated in FIG. 6. Further, when the ECU 14 checks that the malfunction detection result flag 43b is set to zero (0) in the process of S207 illustrated in FIG. 6, the ECU 14 executes the EBD control and ends the EBD process.

Second Embodiment

A second embodiment of the brake control apparatus 1 will be described below in accordance with FIGS. 8 and 9. In the brake control apparatus 1 of the first embodiment, in the case where the EBD control condition is satisfied, the front-right wheel FR is set as the malfunction test subject wheel and the malfunction detection process is executed on the front-wheel brake circuit (i.e. the first hydraulic circuit 18) before the EBD control is executed. Then, in the case where the malfunction is not detected as the result of the malfunction detection process, the ECU 14 executes the EBD control, and in the case where the malfunction is detected, the ECU 14 does not execute the EBD control. On the other hand, in the brake control apparatus 1 of the second embodiment, in the case where the EBD control is satisfied, the EBD control is executed, and then, the front-right wheel FR is set as the malfunction test subject wheel and the malfunction detection process is executed on the front-wheel brake circuit (i.e. the first hydraulic circuit 18) while the EBD control is being executed. Then, in a case where the malfunction is not detected as the result of the malfunction detection process, the ECU 14 continues the EBD control. On the other hand, in the case where the malfunction is detected as the result of the malfunction detection process, the ECU 14 ends the EBD control.

An entire structure of the brake control apparatus 1 of the second embodiment is configured to be the same as the brake control apparatus 1 of the first embodiment. Further, an electrical configuration of the ECU 14 of the second embodiment is substantially the same as the ECU 14 of the first embodiment (see FIG. 2) except for one difference therebetween. In the second embodiment, identical or similar parts or elements are generally denoted by like reference numerals. In the second embodiment, the description of the identical or the same element with the first embodiment will be omitted and the difference between the first and the second embodiments will be mainly described.

Figure 8:
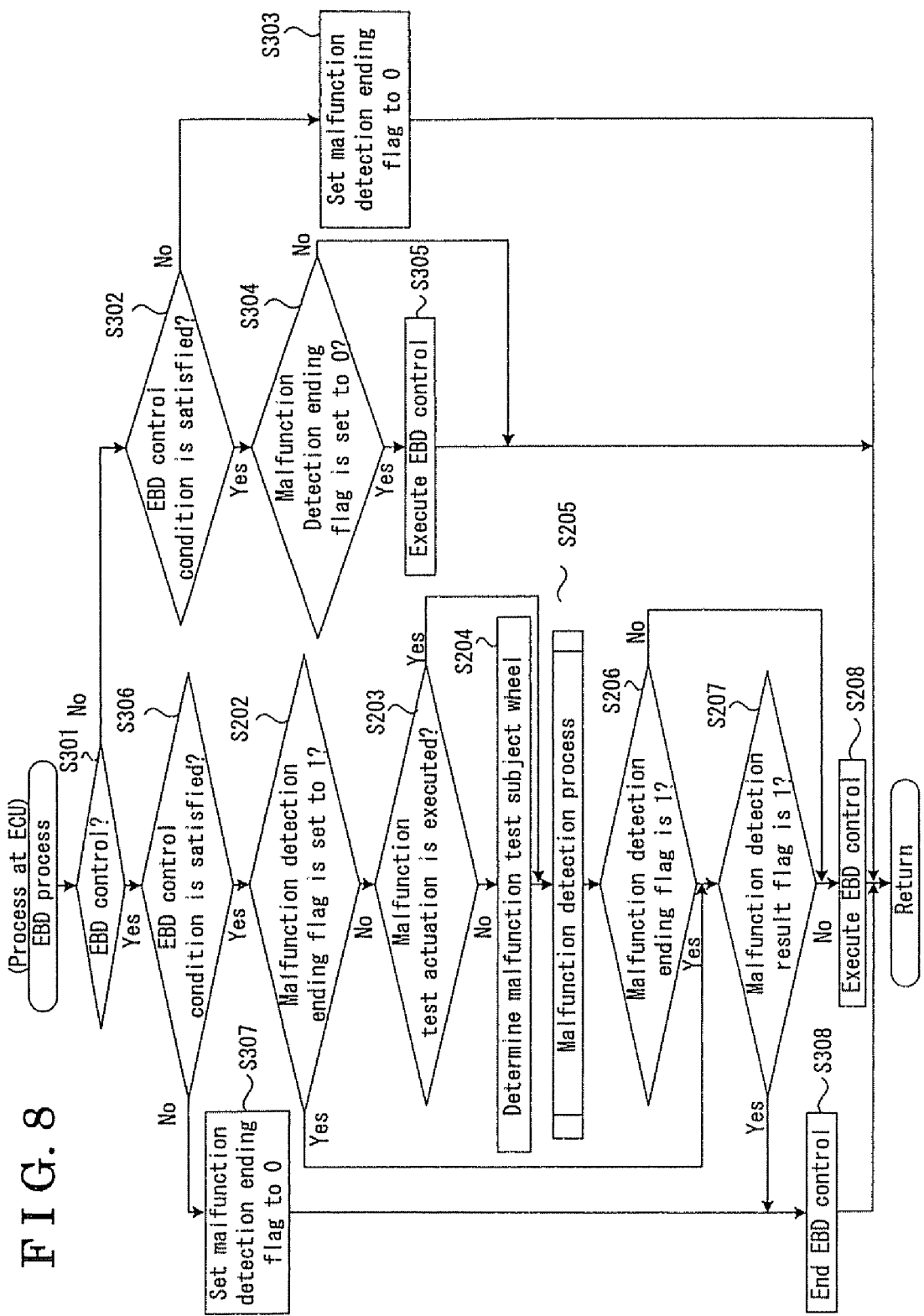
FIG. 8 is a flowchart illustrating an EBD process of the brake control apparatus according to a second embodiment.
Figure 9:
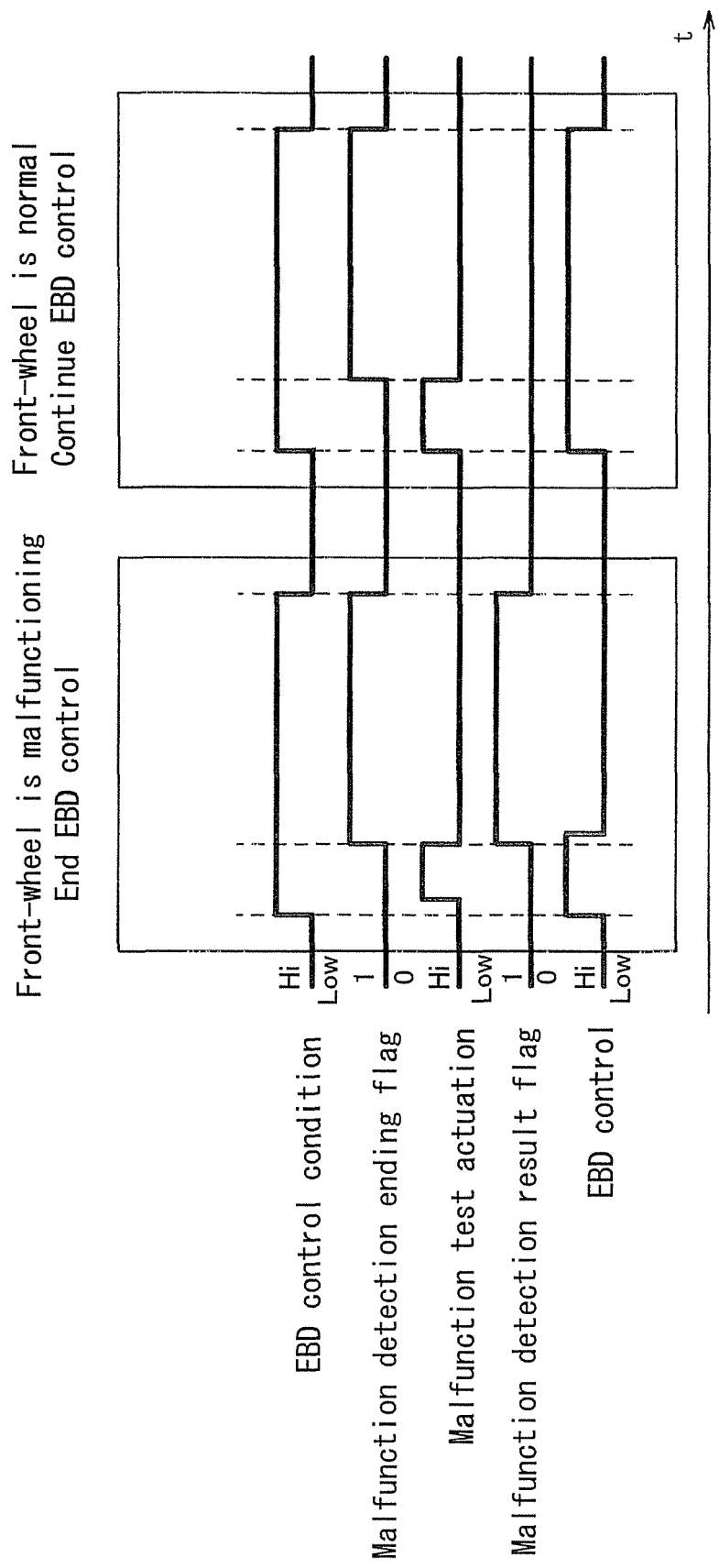
FIG. 9 is a timing diagram for the EBD process according to the second embodiment.

The brake control apparatus 1 of the second embodiment differs from the brake control apparatus 1 of the first embodiment in that the EBD program 42b (see FIG. 2) is a program to control the CPU 41 to run an EBD process illustrated in FIG. 8 instead of controlling the CPU 41 to run the EBD process illustrated in FIG. 6.

When the EBD program 42b of the second embodiment is run by the CPU 41, the ECU 14 once executes the EBD control in the case where the EBD control condition is satisfied (e.g. in the case where the predetermined slips occur at the rear-wheels RR and RL) while the EBD program is not executed. Then, the ECU 14 runs the malfunction detection program 42a while the EBD control is executed in order to detect the malfunction of the brake circuit 18 for the front-wheels FR and FL. In a case where the ECU 14 determines that the malfunction does not occur at the brake circuit 18 for the front-wheels FR and FL, the ECU 14 continues the EBD control. On the other hand, in a case where the ECU 14 determines that the malfunction occurs at the brake circuit 18 for the front-wheels FR and FL, the ECU 14 ends the EBD control. Additionally, the EBD program 42b is run by the CPU 41 at every predetermined time interval (e.g. at every 10 milliseconds).

The malfunction detection program 42a of the second embodiment differs from the malfunction detection program 42a of the first embodiment in that the malfunction detection program 42a of the second embodiment is run by the CPU 41 in the EBD program 42b while the EBD control is being executed. As the malfunction detection program 42a is executed while the EBD control is being executed, the increases of the W/C pressures applied to the wheel cylinders 13c and 13d provided at the rear-wheels RR and RL, respectively, have already been restricted when the malfunction detection program 42a is executed. If the malfunction occurs at the brake circuit 18 for the front-wheels FR and FL, the W/C pressures applied to the wheel cylinders 13c and 13d provided at the rear-wheels RR and RL, respectively are not increased. Hence, the malfunction detection by the malfunction detection program 42a needs to be executed regardless of whether or not the braking force applied to each of the wheels FR, FL, RR, and RL is increased.

Hence, in the malfunction detection program 42a of the second embodiment, the lower limit of the predetermined range for the second vehicle deceleration DV2 is not set at the first vehicle deceleration DV2 in order to check whether or not the second vehicle deceleration DV2 is within the predetermined range at S108 of the malfunction detection process illustrated in FIG. 5. Instead, as is the case with the process of S106, the lower limit of the predetermined range for the second vehicle deceleration DV2 is set at a value of the vehicle deceleration by which the increase of the wheel speed is detectable at the malfunction test subject wheel. As a result, in the case where the vehicle deceleration is very small, the possibility of a false-detection of the malfunction caused because of incapability of detecting the increase of the wheel speed of the target may be eliminated.

The malfunction detection needs to be executed regardless of whether or not the braking force applied to each of the wheels FR, FL, RR and RL is increased. Hence, only by maintaining the W/C pressure applied to the wheel cylinder provided at the malfunction test subject wheel in the case where the braking force applied to each of the wheels FR, FL, RR and RL is not increased when the malfunction detection is executed, the increase of the wheel speed may not occur at the malfunction test subject wheel, thereby failing to detect the malfunction.

Hence, in the brake control apparatus 1 of the second embodiment, the actuation pattern of the corresponding electromagnetic valves for controlling the W/C pressure applied to the wheel cylinder provided at the malfunction test subject wheel is fixed to the "pressure decrease" when executing the malfunction detection. In other words, in the brake control apparatus 1 of the second embodiment, the actuation pattern map 42c is not used, or the actuation pattern map 42c is not provided at the RAM 42. More specifically, in a case where the second vehicle deceleration DV2 is within the predetermined range as a result of the process of S108 (Yes in S108) in the malfunction detection process illustrated in FIG. 5, the ECU 14 sets the actuation pattern of the corresponding electromagnetic valve for controlling the W/C pressure applied to the malfunction test subject wheel to the "pressure decrease" in the case where the malfunction detection is executed, instead of executing the processes of S109, S110, S111 and S112. Then, the ECU 14 proceeds to S13.

Further, in the malfunction detection program 42a of the second embodiment, the ECU 14 checks whether or not other/another brake control(s) than the EBD control is (are) executed. Accordingly, the ECU 14 determines that other brake control is not executed at the process of S104 (No in S104) in a case where other brake control is not executed while the EBD control is being executed. Then, in the case where other condition (i.e. conditions used at the processes of S106 and S108) is satisfied, the malfunction detection is executed.

The timing of setting zero (0) at the malfunction detection ending flag 43a (see FIG. 2) of the second embodiment differs from that of the malfunction detection ending flag 43a of the first embodiment. More specifically, in the second embodiment, zero (0) is set at the malfunction detection ending flag 43a as the default value when an ignition switch (not shown) is turned on, and further, zero (0) is set at the malfunction detection ending flag 43a in a case where the EBD control condition is not satisfied while the EBD control is being executed or while the EBD control is not being executed in the EBD process (see FIG. 8) run by the EBD program 42b (see S303, S307 of FIG. 8). As a result, the EBD control is executed in the case where the EBD control is not being executed and where the EBD control condition is satisfied (see S305 of FIG. 308), and further, the malfunction detection process (see FIG. 5) is executed after the EBD control is started.

The EBD process of the second embodiment executed by the ECU 14 will be described below with reference to FIG. 8. FIG. 8 is a flowchart illustrating the EBD process. The EBD process is executed by running the EBD program 42b at every predetermined time interval (e.g. at every 10 milliseconds).

In the EBD process, the ECU 14 firstly checks whether the EBD control is being executed (S301). For example, an EBD control flag (not shown), which is turned on when the EBD control is started and is turned off when the EBD control is completed, is provided at the Ram 4, so that the EBD control may be executed by checking the content of the EBD control flag. In other words, in a case where the EBD control flag is on, the ECU 14 determines that the EBD control is being executed. On the other hand, in a case where the EBD control flag is off, the ECU 14 determines that the EBD control is not being executed.

In the case where the ECU 14 determines that the EBD control is not being executed as a result of the process of S301, the ECU 14 checks whether the EBD control condition is satisfied (S302). The process of S302 is established in the EBD control in order to determine whether or not to start the EBD control. Then, in a case where the EBD control is not being executed (No in S301) and where the EBD control condition is not satisfied (No in S302), the ECU 14 sets zero (0) at the malfunction detection ending flag 43a and ends the EBD process. Accordingly, the EBD control may be executed and the malfunction detection process may be executed while the EBD control is being executed in a case where the ECU 14 determines by the process of S303 that the EBD control is not being executed and where the EBD control is satisfied.

More specifically, in the case where the EBD control is not being executed (No in S301) and where the EBD control condition is satisfied (Yes in S203), the ECU further checks whether the malfunction detection ending flag 43a is set to zero (0) (S304). In a case where the malfunction detection ending flag 43a is set to zero (0) (Yes in S304), the ECU 14 executes the EBD control (S305) and ends the EBD process. More specifically, the ECU 14 determines that the malfunction detection ending flag 43a is set to zero (0) (Yes in S304) when the brake control apparatus 1 shifts from the state where the EBD control condition is not satisfied to the state where the EBD control condition is satisfied in the case where the EBD control is not being executed. Therefore, when the brake control apparatus 1 shifts from the state where the EBD control condition is not satisfied to the state where the EBD control condition is satisfied in the case where the EBD control is not being executed, the ECU 14 once starts the EBD control by the process of S305.

As a result, the increases of the W/C pressures applied to the wheel cylinders 13c and 13d provided at the rear-wheels RR and RL, respectively, is restricted, thereby preventing the rear-wheels RR and RL from slipping. Additionally, at the process of S305, the EBD control flag provided at the RAM 43 is turned on at the timing of executing the EBD control. Accordingly, the ECU 14 is capable of determining whether or not the EBD control is being executed at the process of S301.

On the other hand, in a case where the ECU 14 determines that the malfunction detection ending flag 43a is not set to zero (0) (i.e. the malfunction detection ending flag 43a is set to one (1)) as the result of the process of S304, the ECU 14 skips the process of S305 and ends the EBD control without executing the EBD control. More specifically, the ECU 14 determines that the malfunction detection ending flag 43a is set to one (1) as the result of the process of S304 (No in S304) in a case where the malfunction detection process (S205) is executed while the EBD control being executed, the malfunction detection ending flag 43a is set to one (1), the ECU 14 determines that the malfunction occurs at the brake circuit for the malfunction test subject wheel (i.e. front-wheels FR and FL) as the result of the malfunction detection process, and where the ECU 14 ends the EBD control (S308). Accordingly, by the ECU 14 skipping the process of S305 and not executing the EBD control, the W/C pressure applied relative to the rear-wheels RR and RL are increased, thereby stopping the vehicle safely in the case where the brake circuit 18 for the front-wheels FR and FL is in the malfunctioning state, even if the EBD control condition is satisfied.

On the other hand, in a case where the ECU 14 determines that the EBD control is being executed (Yes in S301), the ECU 14 checks whether the EBD control is satisfied (S306). The process of S306 is established in the EBD process illustrated in FIG. 8. Generally, the EBD control condition (i.e. the EBD ending condition) used at the process of S306 differs from the EBD control condition (i.e. the EBD starting condition) used for checking whether the EBD control condition is satisfied in the case where the EBD control is not being executed (No in S301).

In a case where the ECU 14 determines that the EBD control condition is not satisfied as the result of the process of S306 (No in S306), the ECU 14 determines that the EBD ending condition is satisfied and sets zero (0) at the malfunction detection ending flag 43a (S307), then the ECU 14 ends the EBD control (S308) in order to end the EBD process. Additionally, in the process of S308, the EBD control flag provided at the RAM 43 is turned off at the timing of ending the EBD control. As a result, the ECU 14 easily determines whether or not the EBD control is being executed at the process of S301.

On the other hand, in a case where the ECU 14 determines that the EBD control condition is satisfied as the result of the process of S306 (Yes in S306), the ECU 14 executes the same processes as S202, S203, S204, S205, S206 and S207 executed at the EBD process of the first embodiment (see FIG. 6). More specifically, the ECU 14 checks whether the malfunction detection ending flag 43a is set to one (1) at the process of S202. In the case where the malfunction detection ending flag 43a is set to zero (0) (No in S202), the ECU 14 further checks whether the malfunction test is executed on the hydraulic pressure controlling apparatus 12 (S203). Then, in the case where the malfunction test is not given to the hydraulic pressure controlling apparatus 12 (No in S203), the ECU 14 determines the front-right wheel FR as the malfunction test subject wheel (S204) and runs the malfunction detection program 42a in order to execute the malfunction detection process (S205). On the other hand, in the case where the malfunction test is executed to the hydraulic pressure controlling apparatus 12 (Yes in S203), the ECU 14 skips the process of S204 and executes the malfunction detection process (S205).

Then, the ECU 14 checks whether the malfunction detection ending flag 43a is set to one (1) after the process of S 205 (S206). In the case where zero (0) is set at the malfunction detection ending flag 43a (No in S206), the ECU 14 continuously executes the EBD control because the malfunction detection is not completed (S208) and then, the ECU 14 ends the EBD process. As a result, the increases of the W/C pressures of the rear-wheels RR and RL are restricted, thereby continuously preventing the rear-wheels RR and RL from slipping.

On the other hand, in the case where the ECU 14 determines that one (1) is set at the malfunction detection ending flag 43a as the results of checking at the processes of S202 and S206 (Yes in S202, Yes in S206), the ECU 14 determines that the malfunction detection by the malfunction detection process is completed. Then, the ECU 14 checks whether the malfunction detection result flag 43b, to which the result of the malfunction detection is stored, is set to one (1) (S207).

In the case where one (1) is set at the malfunction detection result flag 43b (Yes in S207), because the brake circuit 18 for the front-wheels FR and FL is malfunctioning, the ECU 14 proceeds to the process of S308 where the ECU 14 turns off the EBD control flag, provided at the RAM 43, and ends the EBD control. Accordingly, the W/C pressures applied to the rear-wheels RR and RL are increased and the vehicle is safely stopped because the EBD control is ended in the case where the brake circuit 18 for the front-wheels FR and FL is in the malfunctioning state. Then, the ECU 14 ends the EBD control.

On the other hand, in the case where zero (0) is set at the malfunction detection result flag 43b (No in S207), the ECU 14 continuously executes the EBD control because the brake circuit 18 for the front-wheels FR and FL is not malfunctioning (S208), then the ECU 14 ends the EBD control. Accordingly, the increases of the W/C pressures of the rear-wheels RR and RL are restricted, thereby preventing the rear-wheels RR and RL, from slipping.

Each process in the EBD process (see FIG. 8) and a timing of changes of the flags 43a and 43b are described below in reference to FIG. 9. FIG. 9 is a timing diagram illustrating timings of each process and changes of the flags 43a and 43b when the EBD process is executed. As is the case with the timing diagram for the EBD control in the first embodiment (see FIG. 7), FIG. 8 illustrates the case where the brake circuit 18 for the front-wheels FR and FL are malfunctioning and the case where the brake circuit 18 for the front-wheels FR and FL is normal. Further, the timing diagram of FIG. 9 contains rows indicating the EBD control condition indicating whether or not the EBD control condition is satisfied, the malfunction detection ending flag 43a, the malfunction test actuation indicating whether or not the malfunction test actuation is executed, the malfunction detection result flag 43b and the EBD control indicating whether or not the EBD control is executed. The horizontal axis of the timing diagram represents time t.

When the above-described EBD control (see FIG. 8) is started and the EBD control condition is satisfied at the process of S302 in the case where the EBD control is not being executed 6 under the condition where the brake circuit 18 for the front-wheels FR and FL are malfunctioning, the malfunction detection process is once executed at S305 of FIG. 8. Then, while the EBD control is being executed, the malfunction detection process is executed at the process of S205 of FIG. 8 in order to start the malfunction test actuation. Then, when the malfunction test actuation ends, the malfunction detection result flag 43b is set to one (1) and further, the malfunction detection ending flag 43a is set to one (1) by the malfunction detection process.

In the EBD process, when the ECU 14 checks that the malfunction detection ending flag 43a is set to one (1) by the process of S202 or S206 illustrated in FIG. 6, the ECU 14 checks the content of the malfunction detection result flag 43b at the process of S207 illustrated in FIG. 6. Then, in this case, as the malfunction detection result flag 43b is set to one (1), the EBD control is ended at the process of S308 of FIG. 8. Further, while the EBD control condition is being satisfied, one (1) is maintained at the malfunction detection ending flag 43a, and the EBD process is ended by the negative determination at the process of S304 of FIG. 8 (No in S304) without re-executing the EBD control.

On the other hand, as is the case where the brake circuit 18 for the front-wheels FR and FL are malfunctioning, when the above-mentioned EBD process (see FIG. 8) is started and the EBD control condition is satisfied in the process of S302 illustrated in FIG. 8 in the case where the EBD control is not being executed under the condition where the brake circuit 18 for the front-wheels FR and FL is normal, the malfunction detection process is once executed at S305 of FIG. 8. When the malfunction detection process is executed at the process of S205 of FIG. 8 and the malfunction test actuation by the malfunction detection process ends while the EBD control is being executed, the malfunction detection result flag 43b is set to zero (0) and further, the malfunction detection ending flag 43a is set to one (1) by the malfunction detection process. Then, in the EBD process, the ECU 14 checks that the malfunction detection ending flag 43a is set to one (1) at the process of S202 or S206 illustrated in FIG. 6. Further, when the ECU 14 checks that the malfunction detection result flag 43b is set to zero (0) in the process of S207 illustrated in FIG. 6, the ECU 14 continues the EBD control. Accordingly, the ECU 14 continuously executes the EBD control while the EBD control condition is being satisfied.

According to the brake control apparatus 1 of the second embodiment, the ECU 14 controls the W/C pressure applied to the wheel cylinder 13a of the front-right wheel FR to be decreased for the predetermined time while the increases of the W/C pressures applied to the wheel cylinders 13a and 13d of the rear-wheels RR, and RL are restricted by the EBD control. Accordingly, as is the case with the brake control apparatus 1 of the first embodiment, the malfunction of the braking force of the front-wheels is accurately detected.

Further, as the increases of the W/C pressures applied to the wheel cylinders 13c and 13d provided at the rear-wheels RR and RL, respectively, are restricted by the EBD control, the rear-wheels RR and RL are prevented from being locked before the front-wheels FR and FL in response to the load shift when braking. On the other hand, in the case where the ECU 14 detects that the brake circuit 18 for the front-wheels FR and FL is in the malfunctioning state while the increases of the W/C pressures applied to the wheel cylinders 13c and 13d provided at the rear-wheels RR and RL, respectively, are restricted by the EBD control, the ECU 14 ends the EBD control, as a result, the increases of the W/C pressures applied to the wheel cylinders 13c and 13d provided at the rear-wheels RR and RL, respectively, are not restricted. Accordingly, in the case where the brake circuit 18 for the front-wheels FR and FL is in the malfunctioning state, the ECU 14 increases the W/C pressures applied to the wheel cylinders 13c and 13d provided at the rear-wheels RR and RL, respectively, thereby stopping the vehicle safely.

Further, as the malfunction test actuation is executed in order to execute the malfunction detection after the increases of the W/C pressures applied to the wheel cylinders 13c and 13d provided at the rear-wheels RR and RL, respectively, are restricted by the EBD control, the restriction of the increases of the W/C pressures applied to the wheel cylinders 13c and 13d provided at the rear-wheels RR and RL, respectively, by the EBD control is immediately executed in the case where the EBD control condition is satisfied, without being influenced by a time necessary for executing the malfunction detection. Alternatively, as the malfunction detection does not need to be executed when the vehicle deceleration is not great enough and the malfunction detection does not need to be executed in a short time in order to immediately execute the EBD control, the brake control apparatus 1 of the second embodiment ensures accuracy of the malfunction detection. Hence, the brake control apparatus 1 of the second embodiment surely executes the malfunction detection while preventing the rear-wheels RR and RL from being locked before the front-wheels FR and FL, which is caused by delay of starting the restriction of the increases of the W/C pressures applied to the wheel cylinders 13c and 13d of the rear-wheels RR and RL, respectively, because of the execution of the malfunction detection.

The embodiments of the brake control apparatus is described above. However, the present invention is not limited to the above-described embodiments. Variations and changes may be made by others, and equivalents employed, without departing from the spirit of the present invention.

For example, in the above described embodiments, the hydraulic pressure controlling apparatus 12 configures the so-called front-rear type dual circuit system, but the hydraulic pressure controlling apparatus 12 may be modified so as to configure an X-type dual circuit system. More specifically, the hydraulic pressure controlling apparatus 12 may be modified so that the wheel cylinder 13a provided at the front-right wheel FR and the wheel cylinder 13d provided at the rear-left wheel RL are connected to the first hydraulic pressure 18, and the wheel cylinder 13b provided at the front-left wheel FL and the wheel cylinder 13c provided at the rear-right wheel RR, are connected to the second hydraulic circuit 19. Further, in the above-described embodiments, the brake control apparatus 1 includes four wheels and the hydraulic pressure controlling apparatus 12 includes two hydraulic circuits. However, a number of hydraulic circuits provided at the hydraulic pressure controlling apparatus 12 and a number of wheels provided at the brake control apparatus 1 are not limited to the above-described embodiments, and any desired number of hydraulic circuits and wheels may be employed. Even in this case where any desired number of hydraulic circuits and wheels are employed, the malfunction of the braking force is accurately detected by the malfunction detection process illustrated in FIG. 5.

Further, in the above-described embodiments, the malfunction detection process is started when the EBD control condition is satisfied, or while the EBD control is executed. However, the timing of the malfunction detection process may be set at when a first braking is performed after the ignition switch is turned on, at a first braking after the vehicle is stopped for a predetermined time or at every time when the braking is performed.

Further, in the above-described embodiments, the front-right wheel FR is set as the malfunction test subject wheel and the malfunction detection process is executed to the hydraulic circuit for the front-wheels. However, the present invention is not limited to the above-described embodiments, and the front-left wheel FL may be set as the malfunction test subject wheel and the malfunction detection process may be executed. Even in this case, the malfunction detection on the front-wheels FR and FL braked by the first hydraulic circuit 18, i.e. the hydraulic circuit for the front-wheels, is executed. Further, the rear-right wheel RR or the rear-left wheel RL may be set as the malfunction test subject wheel and the malfunction detection process may be executed relative to the hydraulic circuit for the rear-wheels. Accordingly, the malfunction detection of the rear-wheels RR and RL that are braked by the second hydraulic circuit 19, i.e. the malfunction detection of the hydraulic circuit for the rear-wheels, is executed.

Further, in the above-described embodiments, one wheel is set as the malfunction test subject wheel, however, plural wheels, to which the wheel cylinders that are connected to the same hydraulic circuit are provided, may be set as the malfunction test subject wheels, and the malfunction detection may be simultaneously executed to the plural malfunction test subject wheels. More specifically, in the case of the front-rear type dual circuit system illustrated in FIG. 1, for example, if the malfunction detection is simultaneously executed to the front-right wheel FR and the front-left wheel FL, a balance of the vehicle may be maintained because the same level of the braking force acts on the front-right wheel FR and the front-left wheel FL.

Further, in the above-described embodiments, the malfunction detection is ended after the malfunction detection is executed to one malfunction test subject wheel. However, the brake control apparatus 1 may be modified so that the malfunction detection is executed to a wheel, to which a wheel cylinder that is connected to the other hydraulic circuit is provided, after the malfunction detection on the hydraulic brake circuit, to which the one subject wheel is provided, is completed. Accordingly, the malfunction of the braking force caused by the brake fluid leakage may be detected relative to plural hydraulic circuits.

The actuation pattern map 42c illustrated in FIG. 4A in the above-described embodiments is only an example, and is not limited to the contents disclosed in the embodiments. For example, only the vehicle deceleration may be used for a determination condition, or, only the amount of vehicle deceleration changes may be used for the determination condition. More specifically, for example, the actuation pattern may be set as the "pressure decrease" in a case where the wheel speed is equal to or less than the first predetermined value, and the actuation pattern may be set as the "pressure maintenance" in a case where the wheel speed is greater than the first predetermined value. Even in this case, the malfunction detection of the braking force is safely and accurately executed while preventing the driver from feeling discomfort. Additionally, the actuation pattern may be set in more detail by adding plural determination thresholds.

The actuation time map 42d illustrated in FIG. 4B in the above-described embodiments is only an example, and is not limited to the contents disclosed in the embodiments. For example, only the vehicle deceleration may be used for a determination condition, or, only the amount of vehicle deceleration changes may be used for the determination condition. Further, the actuation time and the actuation pattern may be set in more detail by adding plural determination thresholds.

Further, in the above-described embodiment, the case where the actuation pattern and the actuation time of the corresponding electromagnetic valves for controlling the W/C pressure, applied relative to the subject wheel when the malfunction detection is executed, is set on the basis of the actuation pattern map 42c and the actuation time map 42d, is described. However, the present invention is not limited to the above-described case, but the brake control apparatus 1 may be modified so that either one of the actuation pattern and the actuation time may be set on the basis of either one of the actuation pattern map 42c and the actuation time map 42d. Further, the actuation pattern and the actuation time of the corresponding electromagnetic valves for controlling the W/C pressure applied relative to the subject wheel when the malfunction detection is executed, may be fixed without using those maps.

Further, in the above-described embodiments, the brake control apparatus 1 applies the braking force to each wheel by utilizing the hydraulic pressure of the brake fluid as the pressure source. However, the pressure source of the braking force is not limited to the hydraulic pressure of the brake fluid, but any desired pressure source may be utilized. For example, the braking force may be applied to each wheel by utilizing an air pressure as the pressure source.

According to the embodiments, the ECU 14 determines the actuation pattern for the test actuation at the process of S121 so as to reduce or maintain the braking force applied to the malfunction test subject wheel for the predetermined time in the case where the braking force applied to each wheel by each wheel cylinders is increased. If the braking force is properly applied to the malfunction test subject wheel, the wheel speed of the subject wheel increases so as to follow the vehicle speed, which is the actual speed of the vehicle, while the braking force applied to the malfunction test subject wheel is decreased or maintained by the ECU 14. On the other hand, in the case where the malfunction test subject wheel is in the malfunctioning state where the braking force is not appliable thereto, the wheel speed of the subject wheel continuously decreases so as to follow the vehicle speed without being influenced by the braking force. According to the brake control apparatus of the embodiment, the ECU 14 detects that the malfunction test subject wheel is in the malfunctioning state at the process of S125 in the case where the changes of the wheel speed, detected by the sensor SE, towards the acceleration are not detected while the braking force applied to the malfunction test subject wheel is reduced or maintained by the ECU 14. Therefore, the malfunction of the braking force is accurately detected. Further, the malfunction of the braking force is detectable from changes of the wheel speed of the malfunction test subject wheel. Therefore, as the malfunction of the brake force is detectable from the changes of the wheel speed of the malfunction test subject wheel, the influence of the difference of the wheel speed occurs in the case of the known brake control apparatus where wheel speeds of two wheels are compared is eliminated. Hence, the brake control apparatus accurately detects the malfunction of the braking force.

According to the embodiments, the ECU 14 tests the braking force applied relative to the malfunction test subject wheel at S121 by controlling the braking force applied thereto on the basis of the test actuation pattern while the braking force applied relative to each of the wheels FR, FL, RR and RL is increased by the corresponding wheel cylinders 13a, 13b, 13c and 13d.

Accordingly, the ECU 14 determines the actuation pattern for the test at the process of S121 so as to reduce or maintain the braking force applied to the malfunction test subject wheel for the predetermined time in the case where the braking force applied to each of the wheels FR, FL, RR and RL by each of the wheel cylinders 13a, 13b, 13c and 13d increases. Accordingly, as the braking force applied to the malfunction test subject wheel is increased or maintained in the case where the braking force applied to each of the wheels FR, FL, RR and RL by each of the wheel cylinders 13a, 13b, 13c and 13d increases when the malfunction detection is executed, the wheel speed of the malfunction test subject wheel surely changes towards acceleration by the decrease or maintenance of the braking force if the malfunction does not occur at the brake circuit for the malfunction test subject wheel. Therefore, the malfunction of the braking force of the front-wheel is surely detected. Further, as the actuation pattern for the test will be given in the case where the braking force applied to each wheel increases, the malfunction detection is executable at least by maintaining the braking force applied relative to the malfunction test subject wheel. Accordingly, if the actuation pattern for the test is given so as to maintain the braking force applied relative to the subject wheel, the degree of the decrease of the braking force at the subject wheel is controlled to be smaller, compared to the case where the actuation pattern for the test is given so as to decrease the braking force applied relative to the subject wheel. Hence, the driver may feel less discomfort even when the malfunction detection is executed.

Accordingly, the ECU 14 determines the actuation pattern for the test at the process of S121 so as to reduce or maintain the braking force applied to at least one of the front-wheels FR and FL for the predetermined time. Then, in the case where the wheel speed detected by the corresponding wheel sensor SE does not change towards acceleration while the braking force applied to each of the front-wheels FR and FL is decreased or maintained, the ECU 14 determines that the brake circuit 18 for the front-wheels FR and FL is in the malfunctioning state at the process of S125. Hence, the brake control apparatus of the embodiments accurately detects the malfunction of the braking force of the front-wheels FR and FL. Additionally, as the increases of the braking forces applied to the rear-wheels RR and RL are restricted by the ECU 14 at the process of S208, the rear-wheels RR and RL are prevented from being locked before the front-wheels FR and FL caused by the load shift when braking. On the other hand, in the case where the ECU 14 determines that the brake circuit 18 for the front-wheels FR and FL is in the malfunctioning state at the process of S125 before the increases of the braking forces applied to the rear-wheels RR and RL are restricted by the ECU 14 at the process of S208, the ECU 14 prohibits the restriction control of the increases of the braking forces applied to the rear-wheels RR and RI, at the process of S207. Accordingly, as the restriction control of the increase of the braking forces applied to the rear-wheels RR and RI, is surely prohibited in the case where the brake circuit 18 for the front-wheels FR and FL is in the malfunctioning state, the braking forces applied to the rear-wheels RR and RI, are increased, thereby stopping the vehicle safely.

Accordingly, the ECU 14 determines the actuation pattern for the test at the process of S121 so as to reduce the braking force applied to at least one of the front-wheels FR and FL for the predetermined time in the case where the increase of the braking force applied to each of the rear-wheels RR and RL, is restricted. Then, in the case where the wheel speed detected by the corresponding wheel sensor SE does not change towards acceleration while the braking force applied to each of the front-wheels FR and FL is decreased, the ECU 14 determines that the brake circuit 18 for the front-wheels FR and FL is in the malfunctioning state. Hence, the brake control apparatus of the embodiments accurately detects the malfunction of the braking force of the front-wheels FR and FL. Additionally, as the increases of the braking forces applied to the rear-wheels RR and RL are restricted by the ECU 14 at the process of S305, the rear-wheels RR, and RL are prevented from being locked before the front-wheels FR and FL caused by the load shift when braking. On the other hand, in the case where the ECU 14 determines that the brake circuit 18 for the front-wheels FR and FL is in the malfunctioning state while the increases of the braking forces applied to the rear-wheels RR, and RL are restricted by the ECU 14 at the process of S305, the ECU 14 ends the restriction control of the increases of the braking forces applied to the rear-wheels RR and RL at the process of S308. Accordingly, in the case where the brake circuit 18 for the front-wheels FR and FL is in the malfunctioning state, the braking forces applied to the rear-wheels RR and RL, are increased, thereby stopping the vehicle safely. Further, as the actuation pattern for the test is given and the malfunction detection is executed by the ECU 14 after the increases of the braking forces applied to the rear-wheels RR and RL are restricted at the process of S305, the restriction control of the increases of the braking forces applied to the rear-wheels RR and RL is immediately executable in the case where the condition for restricting the increases of the braking forces applied to the rear-wheels RR and RL is satisfied, without being influenced by the time necessary for executing the malfunction detection. Alternatively, as the malfunction detection does not need to be executed when the vehicle deceleration is not great enough or the malfunction detection does not need to be executed in a short time in order to immediately execute the restriction control of the braking forces applied to the rear-wheels RR and RL, the brake control apparatus 1 of the embodiments ensures accuracy of the malfunction detection. Hence, the brake control apparatus 1 of the embodiments surely executes the malfunction detection while preventing the rear-wheels RR and RL from being locked before the front-wheels FR and FL, which is caused by delay of starting the restriction of the increases of braking forces applied to the rear-wheels RR and RL, respectively, because of the execution of the malfunction detection.

According to the embodiments, the ECU 14 calculates the vehicle deceleration on the basis of the wheel speed detected by the wheel speed sensor SE at S107. Further, the ECU 14 controls the braking force applied relative to the malfunction test subject wheel (e.g. the front-right wheel FR) to be reduced in a case where the second vehicle deceleration DV2 calculated by the ECU 14 at S107 is equal to or less than the first predetermined value, and the ECU 14 controls the braking force applied relative to the malfunction test subject wheel (e.g. the front-right wheel) to be maintained in other cases.

Accordingly, in the case where the second vehicle deceleration DV2, calculated by the ECU 14 at the process of S107, is equal to or less than the first predetermined value, the ECU 14 controls the braking force of the malfunction test subject wheel to be decreased. In other cases, the ECU 14 controls the braking force applied relative to the malfunction test subject wheel to be maintained. Accordingly, the malfunction detection is surely executed in the case where the vehicle deceleration is low, because the wheel speed of the malfunction test subject wheel surely changes towards acceleration by the decrease of the braking force if the malfunction does not occur at the brake circuit for the malfunction test subject wheel. Further, in this case, the level of decrease of the braking force is low because the vehicle deceleration is low. Hence, the driver may feel less discomfort even when the test is executed by the ECU 14. On the other hand, in the case where the vehicle deceleration is great, the wheel speed of the malfunction test subject wheel quickly increases if the brake circuit for the subject wheel is not malfunctioning. Hence, the malfunction detection is surely executed only by maintaining the braking force without reducing the braking force. Further, in this case, the level of the decrease of the braking force is low, because the braking force is not reduced but maintained. Accordingly, the driver may feel less discomfort even when the test is executed by the ECU 14. As a result, the brake control apparatus of the embodiments safely and surely executes the malfunction detection of the braking force while preventing the driver from feeling discomfort.

According to the embodiments, the ECU 14 calculates the first and second vehicle decelerations DV1 and DV2 at S105, S107, respectively, on the basis of the wheel speed detected by the wheel speed sensor SE. Further, the ECU 14 calculates the amount of the vehicle deceleration changes at S110 on the basis of the first and second vehicle decelerations DV1 and DV2 calculated by the ECU 14 at S105 and S107, respectively. The ECU 14 controls the braking force applied relative to the malfunction test subject wheel (e.g. the front-right wheel) to be decreased in the case where the second vehicle deceleration DV2 calculated by the ECU 14 at S107 is equal to or less than the first predetermined value and in the case where the amount of the vehicle deceleration changes calculated by the ECU 14 at S110 is equal to or less than the second predetermined value, and the ECU 14 controls the braking force applied relative to the malfunction test subject wheel (e.g. the front-right wheel) to be maintained in other cases.

Accordingly, the ECU 14 reduces the braking force of the malfunction test subject wheel at the process of S121 in the case where the vehicle deceleration DV2 calculated by the ECU 14 at the process of S107 is equal to or less than the first predetermined value and in the case where the temporal changing amount of the vehicle deceleration, calculated by the ECU 14 at the process of S110, is equal to or less than the second predetermined value. On the other hand, the ECU 14 maintains the braking force of the malfunction test subject wheel in other cases. As a result, the malfunction detection is surely executed in the case where the vehicle deceleration is low and in the case where the temporal changing amount of the vehicle deceleration is small, because the wheel speed of the malfunction test subject wheel surely changes towards acceleration by the decrease of the braking force if the brake circuit for the subject wheel is not malfunctioning. Further, in this case, the level of decrease of the braking force is low because the vehicle deceleration is low and because the temporal changing amount of the vehicle deceleration is small. Hence, the driver may feel less discomfort even when the test is given by the ECU 14. On the other hand, in the case where the vehicle deceleration is great or in the case where the temporal changing amount of the vehicle deceleration is great, the wheel speed of the malfunction test subject wheel quickly increases if the brake circuit for the subject wheel is not malfunctioning. Hence, in this case, the malfunction detection is surely executed only by maintaining the braking force without reducing the braking force. Further, in this case, the level of the decrease of the braking force is low, because the braking force is not reduced but maintained. Accordingly, the driver may feel less discomfort even when the test is executed by the ECU 14. As a result, the brake control apparatus of the embodiments safely and surely executes the malfunction detection of the braking force while preventing the driver from feeling discomfort.

According to the embodiments, the ECU 14 calculates the second vehicle deceleration DV2 at S107 on the basis of the wheel speed detected by the wheel speed sensor SE. The ECU 14 sets the time (T1, T2) for reducing or maintaining the braking force applied relative to the malfunction test subject wheel (e.g. the front-right wheel) in the case where the second vehicle deceleration DV2 calculated by the ECU 14 at S107 is equal to or less than the third predetermined value to be longer than the time (T3, T4) for reducing or maintaining the braking force applied relative to the malfunction test subject wheel (e.g. the front-right wheel) in the case where the second vehicle deceleration DV2 is greater than the third predetermined value.

Accordingly, the time (T1, T2), during which the ECU 14 reduces or maintains the braking force of the malfunction test subject wheel at the process of S121 in the case where the second vehicle deceleration DV2 calculated by the ECU 14 at the process of S107 is equal to or less than the third predetermined value, is set to be longer than the time (T3, T4) for reducing or maintaining the braking force in the case where the second vehicle deceleration DV2 is greater than the third predetermined value. As a result, the brake control apparatus of the embodiments surely detects the increase of the wheel speed of the malfunction test subject wheel in the case where the vehicle deceleration is low, because the time for reducing or maintaining the braking force is set to be relatively longer. Hence, the malfunction detection is surely executed. Further, even if the time for reducing or maintaining the braking force is extended, the driver may feel less discomfort even when the test is executed because the vehicle deceleration is low. On the other hand, in the case where the vehicle deceleration is great, the brake control apparatus 1 of the embodiments surely detects whether or not the increase of the wheel speed of the malfunction test subject wheel occurs even if the time for reducing or maintaining the braking force is shortened, because the wheel speed of the malfunction test subject wheel quickly increases if the brake circuit for the subject wheel is not malfunctioning. Hence, the malfunction detection is surely executed. Further, the increase of the braking distance caused by the decrease of the braking force is reduced, and the driver may feel less discomfort even if the malfunction test is executed by the ECU 14, because the time for reducing or maintaining the braking force is relatively short. As a result, the brake control apparatus 1 of the embodiments safely and surely executes the malfunction detection of the braking force while preventing the driver from feeling discomfort.

According to the embodiments, the ECU 14 calculates the first and second vehicle decelerations DV1 and DV2 at S105 and S107, respectively, on the basis of the wheel speed detected by the wheel speed sensor SE. Further, the ECU 14 calculates the amount of the vehicle deceleration changes on the basis of the first and second vehicle decelerations DV1 and DV2 calculated by the ECU 14 at S105 and S107, respectively. The ECU 14 sets the time (T1, T3) for reducing or maintaining the braking force applied relative to the malfunction test subject wheel (e.g. the front-right wheel) in the case where the amount of vehicle deceleration changes is equal to or less than the fourth predetermined value to be longer than the time (T2, T4) for reducing or maintaining the braking force applied relative to the malfunction test subject wheel (e.g. the front-right wheel) in the case where the amount of vehicle deceleration changes is greater than the fourth predetermined value.

Accordingly, the first and the second vehicle deceleration DV1 and DV2 are calculated by the ECU 14 at the processes of S105 and S107, respectively, and the ECU 14 calculates the temporal changing amount of the vehicle deceleration on the basis of the first and the second vehicle deceleration DV1 and DV2 at the processes of S114 and S117. Then, the time (T1, T3), during which the ECU 14 reduces or maintains the braking force of the malfunction test subject wheel at the process of S121 in the case where the temporal changing amount of the vehicle deceleration is equal to or less than the fourth predetermined value, is set to be longer than the time (T2, T4) for reducing or maintaining the braking force in the case where the temporal changing amount of vehicle deceleration is greater than the fourth predetermined value. As a result, the brake control apparatus 1 of the embodiments surely detects the increase of the wheel speed of the malfunction test subject wheel in the case where the temporal changing amount of the vehicle deceleration is low, because the time for reducing or maintaining the braking force is set to be relatively longer. Hence, the malfunction detection is surely executed. Further, even if the time for reducing or maintaining the braking force is extended, the driver may feel less discomfort because the temporal changing amount of the vehicle deceleration is low. On the other hand, in the case where the temporal changing amount of the vehicle deceleration is great, the brake control apparatus 1 of the embodiments surely detects whether or not the increase of the wheel speed of the malfunction test subject wheel occurs even if the time for reducing or maintaining the braking force is shortened, because the wheel speed of the malfunction test subject wheel quickly increases if the brake circuit for the subject wheel is not malfunctioning. Hence, the malfunction detection is surely executed. Further, the increase of the braking distance caused by decrease of the braking force is reduced, and the driver may feel less discomfort even if the malfunction test is executed by the ECU 14, because the time for reducing or maintaining the braking force is relatively short. As a result, the brake control apparatus 1 of the embodiments safely and surely executes the malfunction detection of the braking force while preventing the driver from feeling discomfort.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A brake control apparatus comprising:
a braking force applying means for applying a braking force to each of a plurality of wheels adapted to a vehicle;
a braking force testing means for testing the braking force of a predetermined malfunction test subject wheel by controlling the braking force applied to the malfunction test subject wheel to be reduced or maintained for a predetermined time on the basis of a test actuation pattern while the braking force applied to each of the plurality of wheels is increased by the braking force applying means;
a wheel speed detecting means for detecting a wheel speed of each of the plurality of the wheels including the malfunction test subject wheel, the wheel speed corresponding to a rotational speed of each of the plurality of the wheels; and
a malfunction determining means for determining a malfunctioning state, where the braking force is not applied to the malfunction test subject wheel, in a case where the wheel speed generated in the case where the braking force of the malfunction test subject wheel is controlled on the basis of the test actuation pattern continuously changes at the same gradient as the changes of the wheel speed in the case where the braking force thereof is not controlled on the basis of the test actuation pattern.

2. The brake control apparatus according to claim 1 further including a deceleration calculating means for calculating a vehicle deceleration on the basis of the wheel speed detected by the wheel speed detecting means, wherein the braking force testing means controls the braking force applied to the malfunction test subject wheel to be reduced in a case where the vehicle deceleration calculated by the deceleration calculating means is equal to or less than a first predetermined value, and the braking force testing means controls the braking force applied to the malfunction test subject wheel to be maintained in a case where the vehicle deceleration calculated by the deceleration calculating means is greater than the first predetermined value.

3. The brake control apparatus according to claim 1 further including a deceleration calculating means for calculating a vehicle deceleration on the basis of the wheel speed detected by the wheel speed detecting means, and a deceleration change calculating means for calculating an amount of vehicle deceleration change on the basis of the vehicle deceleration calculated by the deceleration calculating means, wherein the braking force testing means controls the braking force applied to the malfunction test subject wheel to be decreased in a case where the vehicle deceleration calculated by the deceleration calculating means is equal to or less than a first predetermined value and in a case where the amount of vehicle deceleration change calculated by the deceleration change calculating means is equal to or less than a second predetermined value, and the braking force testing means controls the braking force applied to the malfunction test subject wheel to be maintained in a case where the vehicle deceleration calculated by the deceleration calculating means is greater than the first predetermined value and in a case where the amount of vehicle deceleration change calculated by the deceleration change calculating means is greater than the second predetermined value.

4. The brake control apparatus according to claim 1 further including a deceleration calculating means for calculating a vehicle deceleration on the basis of the wheel speed detected by the wheel speed detecting means, wherein the braking force testing means sets a time for reducing or maintaining the braking force applied to the malfunction test subject wheel in a case where the vehicle deceleration calculated by the deceleration calculating means is equal to or less than a third predetermined value to be longer than a time for reducing or maintaining the braking force applied to the malfunction test subject wheel in a case where the vehicle deceleration is greater than the third predetermined value.

5. The brake control apparatus according to claim 1 further including a deceleration calculating means for calculating a vehicle deceleration on the basis of the wheel speed detected by the wheel speed detecting means, and a deceleration change calculating means for calculating an amount of vehicle deceleration change on the basis of the vehicle deceleration calculated by the deceleration calculating means, wherein the braking force testing means sets a time for reducing or maintaining the braking force applied to the malfunction test subject wheel in a case where the amount of vehicle deceleration change calculated by the deceleration change calculating means is equal to or less than a fourth predetermined value to be longer than a time for reducing or maintaining the braking force applied to the malfunction test subject wheel in a case where the amount of vehicle deceleration change is greater than the fourth predetermined value.

6. A brake control apparatus comprising:
a braking force applying means for applying a braking force to each of a plurality of wheels, having a front-wheel and a rear-wheel, adapted to a vehicle;
a rear-wheel braking force restriction-controlling means for restricting an increase of the braking force applied to the rear-wheel;
a braking force testing means for testing the braking force applied to the front-wheel by controlling the braking force applied to the front-wheel to be reduced or maintained for a predetermined time on the basis of a test actuation pattern before the increase of the braking force applied to the rear-wheel is restricted by the rear-wheel braking force restriction-controlling means, while the braking force applied to each of the plurality of wheels is increased by the braking force applying means;
a wheel speed detecting means for detecting a wheel speed of the front-wheel to which the braking force controlled by the braking force testing means is applied, the wheel speed indicating a rotational speed of the front-wheel;
a malfunction determining means for determining a malfunctioning state, where the braking force is not applied to the front-wheel, in a case where the wheel speed generated in the case where the braking force of the front-wheel is controlled on the basis of the test actuation pattern continuously changes at the same gradient as the changes of the wheel speed in the case where the braking force thereof is not controlled on the basis of the test actuation pattern; and
a rear-wheel braking force restriction-control prohibiting means for prohibiting a restriction control on the increase of the braking force applied to the rear-wheel by the rear-wheel braking force restriction-controlling means in a case where the malfunction determining means determines that the front-wheel is in the malfunctioning state.

7. The brake control apparatus according to claim 6 further including a deceleration calculating means for calculating a vehicle deceleration on the basis of the wheel speed detected by the wheel speed detecting means, wherein the braking force testing means controls the braking force applied to the front-wheel to be reduced in a case where the vehicle deceleration calculated by the deceleration calculating means is equal to or less than a first predetermined value, and the braking force testing means controls the braking force applied to the front-wheel to be maintained in a case where the vehicle deceleration calculated by the deceleration calculating means is greater than the first predetermined value.

8. The brake control apparatus according to claim 6 further including a deceleration calculating means for calculating a vehicle deceleration on the basis of the wheel speed detected by the wheel speed detecting means, and a deceleration change calculating means for calculating an amount of vehicle deceleration change on the basis of the vehicle deceleration calculated by the deceleration calculating means, wherein the braking force testing means controls the braking force applied relative to the front-wheel to be decreased in a case where the vehicle deceleration calculated by the deceleration calculating means is equal to or less than a first predetermined value and in a case where the amount of vehicle deceleration change calculated by the deceleration change calculating means is equal to or less than a second predetermined value, and the braking force testing means controls the braking force applied to the front-wheel to be maintained in a case where the vehicle deceleration calculated by the deceleration calculating means is greater than the first predetermined value and in a case where the amount of vehicle deceleration change calculated by the deceleration change calculating means is greater than the second predetermined value.

9. The brake control apparatus according to claim 6 further including a deceleration calculating means for calculating a vehicle deceleration on the basis of the wheel speed detected by the wheel speed detecting means, wherein the braking force testing means sets a time for reducing or maintaining the braking force applied to the front-wheel in a case where the vehicle deceleration calculated by the deceleration calculating means is equal to or less than a third predetermined value to be longer than a time for reducing or maintaining the braking force applied to the front-wheel in a case where the vehicle deceleration is greater than the third predetermined value.

10. The brake control apparatus according to claim 6 further including a deceleration calculating means for calculating a vehicle deceleration on the basis of the wheel speed detected by the wheel speed detecting means, and a deceleration change calculating means for calculating an amount of vehicle deceleration change on the basis of the vehicle deceleration calculated by the deceleration calculating means, wherein the braking force testing means sets a time for reducing or maintaining the braking force applied to the front-wheel in a case where the amount of vehicle deceleration change calculated by the deceleration change calculating means is equal to or less than a fourth predetermined value to be longer than a time for reducing or maintaining the braking force applied to the front-wheel in a case where the amount of vehicle deceleration change is greater than the fourth predetermined value.

11. A brake control apparatus comprising:
a braking force applying means for applying a braking force to each of a plurality of wheels, having a front-wheel and a rear-wheel, adapted to a vehicle;
a rear-wheel braking force restriction-controlling means for restricting an increase of the braking force applied to the rear-wheel;
a braking force testing means for testing the braking force applied to the front-wheel by controlling the braking force applied to the front-wheel to be reduced for a predetermined time on the basis of a test actuation pattern while the increase of the braking force applied to the rear-wheel is restricted by the rear-wheel braking force restriction-controlling means;
a wheel speed detecting means for detecting a wheel speed of the front-wheel to which the braking force controlled by the braking force testing means is applied, the wheel speed indicates a rotational speed of the front-wheel;
a malfunction determining means for determining a malfunctioning state, where the braking force is not applied to the front-wheel, in a case where the wheel speed generated in the case where the braking force of the front-wheel is controlled on the basis of the test actuation pattern continuously changes at the same gradient as the changes of the wheel speed in the case where the braking force thereof is not controlled on the basis of the test actuation pattern; and
a rear-wheel braking force restriction-control ending means for ending a restriction control on the increase of the braking force applied to the rear-wheel by the rear-wheel braking force restriction-controlling means in a case where the malfunction determining means determines that the front-wheel is in the malfunctioning state.

12. The brake control apparatus according to claim 11 further including a deceleration calculating means for calculating a vehicle deceleration on the basis of the wheel speed detected by the wheel speed detecting means, wherein the braking force testing means sets a time for reducing or maintaining the braking force applied to the front-wheel in a case where the vehicle deceleration calculated by the deceleration calculating means is equal to or less than a third predetermined value to be longer than a time for reducing or maintaining the braking force applied to front-wheel in a case where the vehicle deceleration is greater than the third predetermined value.

13. The brake control apparatus according to claim 11 further including a deceleration calculating means for calculating a vehicle deceleration on the basis of the wheel speed detected by the wheel speed detecting means, and a deceleration change calculating means for calculating an amount of vehicle deceleration change on the basis of the vehicle deceleration calculated by the deceleration calculating means, wherein the braking force testing means sets a time for reducing or maintaining the braking force applied to the front-wheel in a case where the amount of vehicle deceleration change calculated by the deceleration change calculating means is equal to or less than a fourth predetermined value to be longer than a time for reducing or maintaining the braking force applied to the front-wheel in a case where the amount of vehicle deceleration change is greater than the fourth predetermined value.

* * * * *